(12) United States Patent
Wilson

(10) Patent No.: US 9,327,938 B2
(45) Date of Patent: May 3, 2016

(54) CABLE RETRACTOR

(71) Applicant: Haworth, Inc., Holland, MI (US)

(72) Inventor: Harold R. Wilson, Holland, MI (US)

(73) Assignee: Haworth, Inc., Holland, MI (US)

( * ) Notice: Subject to any disclaimer, the term of this patent is extended or adjusted under 35 U.S.C. 154(b) by 40 days.

(21) Appl. No.: 13/767,211

(22) Filed: Feb. 14, 2013

(65) Prior Publication Data

US 2014/0224913 A1    Aug. 14, 2014

(51) Int. Cl.
    *B65H 75/44*    (2006.01)
    *H02G 11/02*    (2006.01)

(52) U.S. Cl.
    CPC ........ *B65H 75/4402* (2013.01); *B65H 75/4434* (2013.01); *B65H 75/4449* (2013.01); *H02G 11/02* (2013.01); *B65H 2701/34* (2013.01)

(58) Field of Classification Search
    CPC .... H02G 11/02; B60R 16/027; H01R 35/025; B65H 75/4434; B65H 75/4449
    USPC ............................ 242/378, 378.1–378.4, 388, 242/388.1–388.2, 0.6, 0.9–0.91, 422, 422.4, 242/615.2, 615.3
    See application file for complete search history.

(56) References Cited

U.S. PATENT DOCUMENTS

| | | | |
|---|---|---|---|
| 906,045 A * | 12/1908 | Martin | .............................. 54/61 |
| 1,918,657 A | 7/1933 | Millar | |
| 1,958,626 A | 5/1934 | Krantz | |
| 2,184,363 A | 12/1939 | Schultz et al. | |
| 2,206,352 A * | 7/1940 | Hellmann | .................. 242/378.2 |
| 2,262,587 A * | 11/1941 | Kaempf | ......................... 242/376 |
| 2,406,874 A * | 9/1946 | Walker | ............................. 446/32 |
| 2,518,071 A | 8/1950 | Rushworth | |

(Continued)

FOREIGN PATENT DOCUMENTS

| | | |
|---|---|---|
| DE | 3440209 A1 | 5/1986 |
| DE | 19811423 | 9/1999 |

(Continued)

OTHER PUBLICATIONS

Minimum Optical Fiber Bend Radius, Corning Cable Systems LLC, 2006.

(Continued)

*Primary Examiner* — Emmanuel M Marcelo
*Assistant Examiner* — Michael Gallion
(74) *Attorney, Agent, or Firm* — Warner Norcross & Judd LLP

(57) ABSTRACT

A cable retractor for use in a variety of applications includes a housing forming an internal chamber, and first and second drums within the chamber for winding of the cable. The first drum may include a stationary outer surface, and the second drum may be formed by a plurality of rollers mounted on a rotatable frame. The rollers may orbit about the first drum upon rotation of said frame, with each of the rollers also rotating about its own roller axis. The first and second drums may be sized to enable wrapping of the cable both side-by-side and in multiple layers about at least one of the first drum and the second drum. The cable retractor may include structure to urge the rollers to rotate with respect to the frame as the frame rotates. For example, a portion of the rollers may be frictionally engaged with a track, and capable of slipping with respect to the track to provide smooth extension and retraction of the cable even as multiple layers of cable are wound about the first and second drums.

18 Claims, 21 Drawing Sheets

(56) References Cited

U.S. PATENT DOCUMENTS

| | | |
|---|---|---|
| 2,609,587 A | 9/1952 | Kuljian |
| 2,820,112 A | 1/1958 | Lupu |
| 3,106,368 A | 10/1963 | Tait et al. |
| 3,160,360 A | 12/1964 | Spieldiener et al. |
| 3,403,578 A * | 10/1968 | Morse .......................... 74/500.5 |
| 3,474,985 A | 10/1969 | Brudi et al. |
| 3,545,693 A | 12/1970 | Gurner et al. |
| 3,637,152 A * | 1/1972 | Okamoto .................. 242/326.1 |
| 3,657,491 A * | 4/1972 | Ryder et al. ............. 191/12.2 R |
| 3,695,544 A | 10/1972 | Morey, Sr. |
| 3,763,455 A * | 10/1973 | Confer et al. ................... 439/15 |
| 3,773,987 A | 11/1973 | Davis et al. |
| 3,858,011 A | 12/1974 | Salvin et al. |
| 3,864,188 A * | 2/1975 | Grawey et al. ............. 242/434.9 |
| 4,132,367 A * | 1/1979 | Ineson et al. .................. 242/376 |
| 4,174,816 A | 11/1979 | Olson |
| 4,228,966 A * | 10/1980 | Croese .......................... 242/407 |
| 4,413,791 A | 11/1983 | Kawaguchi et al. |
| 4,428,540 A * | 1/1984 | Calcagno et al. .......... 242/478.2 |
| 4,483,330 A * | 11/1984 | Jacobsen et al. ................ 602/32 |
| 4,766,937 A | 8/1988 | Kojima et al. |
| 4,884,758 A * | 12/1989 | Hamkins .................... 242/437.1 |
| 5,046,951 A * | 9/1991 | Suzuki ............................ 439/15 |
| 5,094,396 A | 3/1992 | Burke |
| 5,137,223 A * | 8/1992 | Brandon et al. ............. 242/420 |
| 5,156,349 A | 10/1992 | Wilson et al. |
| 5,186,406 A | 2/1993 | Romanelli |
| 5,224,871 A * | 7/1993 | Ida et al. ....................... 439/164 |
| 5,241,593 A | 8/1993 | Wagner |
| 5,277,604 A * | 1/1994 | Ida et al. ....................... 439/164 |
| 5,279,473 A * | 1/1994 | Rozon .......................... 242/377 |
| 5,332,171 A | 7/1994 | Steff |
| 5,421,530 A | 6/1995 | Bertagna et al. |
| 5,588,626 A | 12/1996 | Yang |
| 5,637,005 A * | 6/1997 | Bannai et al. ................. 439/164 |
| 5,775,473 A | 7/1998 | Cordero |
| 5,915,062 A | 6/1999 | Jackson et al. |
| 5,928,018 A * | 7/1999 | Dumoulin .................... 439/164 |
| 6,019,304 A | 2/2000 | Skowronski et al. |
| 6,038,362 A | 3/2000 | Toyoda et al. |
| 6,077,108 A * | 6/2000 | Lorscheider et al. ......... 439/501 |
| 6,095,836 A * | 8/2000 | Bolen et al. .................. 439/164 |
| 6,213,797 B1 * | 4/2001 | Best et al. ..................... 439/164 |
| 6,220,413 B1 | 4/2001 | Walters et al. |
| 6,234,417 B1 | 5/2001 | Sauder et al. |
| 6,264,487 B1 * | 7/2001 | Taniuchi et al. .............. 439/164 |
| 6,293,485 B1 | 9/2001 | Hollowed |
| 6,327,507 B1 * | 12/2001 | Buchan ......................... 607/115 |
| 6,349,893 B1 | 2/2002 | Daoud |
| 6,375,109 B1 * | 4/2002 | Liao .............................. 242/378 |
| 6,389,211 B1 | 5/2002 | Mandry et al. |
| 6,405,961 B1 | 6/2002 | Mastrangelo |
| 6,483,033 B1 | 11/2002 | Simoes et al. |
| 6,497,378 B1 * | 12/2002 | Liao ........................... 242/378.1 |
| 6,540,168 B1 | 4/2003 | Archer et al. |
| 6,616,080 B1 * | 9/2003 | Edwards et al. ........... 242/378.1 |
| 6,726,140 B2 | 4/2004 | Wivagg |
| 6,736,346 B1 | 5/2004 | Park |
| 6,744,959 B2 | 6/2004 | Takahashi |
| 6,780,032 B2 * | 8/2004 | Rhein et al. ................... 439/164 |
| 6,834,820 B2 | 12/2004 | Wei |
| 6,874,722 B2 | 4/2005 | Wei |
| 7,000,863 B2 | 2/2006 | Bethea et al. |
| 7,017,846 B2 | 3/2006 | Tsoi et al. |
| 7,104,491 B2 | 9/2006 | Vinding |
| 7,108,216 B2 | 9/2006 | Burke et al. |
| 7,172,150 B1 | 2/2007 | Hutchison, II et al. |
| 7,379,650 B2 | 5/2008 | Weinert et al. |
| 7,389,955 B2 | 6/2008 | Liao |
| 7,493,006 B2 | 2/2009 | Welnert et al. |
| 7,523,883 B2 | 4/2009 | Cheng |
| 7,533,841 B1 | 5/2009 | Harrison et al. |
| 7,607,603 B1 | 10/2009 | Chang |
| 7,715,679 B2 | 5/2010 | Kowalczyk et al. |
| 7,811,108 B2 * | 10/2010 | Oishi et al. .................... 439/164 |
| 7,900,863 B1 | 3/2011 | Cheng |
| 8,131,126 B2 | 3/2012 | Kowalczyk et al. |
| 8,146,853 B2 * | 4/2012 | Godett et al. ............... 242/388.1 |
| 8,181,744 B2 * | 5/2012 | Parker et al. .................. 182/232 |
| 8,184,777 B1 | 5/2012 | Larkin |
| 8,763,944 B2 * | 7/2014 | Dorosko et al. ........... 242/388.5 |
| 2001/0028013 A1 | 10/2001 | Dirnberger et al. |
| 2002/0166915 A1 * | 11/2002 | Sakata .......................... 242/388 |
| 2005/0006517 A1 | 1/2005 | Wei |
| 2005/0184186 A1 | 8/2005 | Tsoi et al. |
| 2006/0054728 A1 | 3/2006 | Gallego et al. |
| 2006/0057863 A1 * | 3/2006 | Araki et al. ..................... 439/15 |
| 2011/0017858 A1 * | 1/2011 | Sturgis et al. .............. 242/388.9 |
| 2011/0024543 A1 | 2/2011 | Smrha |
| 2011/0061981 A1 * | 3/2011 | Ori et al. .................. 191/12.2 R |
| 2011/0209383 A1 * | 9/2011 | Tennyson .......................... 43/21 |
| 2011/0259991 A1 * | 10/2011 | Goldstein et al. ............. 242/388 |
| 2012/0312651 A1 * | 12/2012 | Kramer et al. ........... 191/12.2 R |
| 2013/0221149 A1 * | 8/2013 | Sodeyama ..................... 242/422 |
| 2013/0344706 A1 * | 12/2013 | Sato et al. ....................... 439/15 |
| 2014/0011374 A1 * | 1/2014 | Adachi ............................ 439/13 |

FOREIGN PATENT DOCUMENTS

| | | |
|---|---|---|
| EP | 0368611 A3 | 5/1990 |
| FR | 576849 | 8/1924 |
| FR | 2905366 A1 * | 3/2008 |
| GB | 866756 | 4/1961 |
| GB | 2224486 | 5/1990 |
| JP | 62191382 | 12/1987 |
| JP | 984244 | 3/1997 |
| WO | 0121521 | 3/2001 |
| WO | 2008025810 | 3/2008 |

OTHER PUBLICATIONS

Kramer Electronics, Ltd. User Manual, Model: K-Able Box Cable Retractor.
Komtech Motorized Cable Retractor, downloaded Jul. 7, 2012.
Retractor Cable Retraction System for Cable Cubby Enclosures, Extron Electronics, 2009.
Extended European Search Report for Application No. 14154795.0, dated Apr. 17, 2014.

* cited by examiner

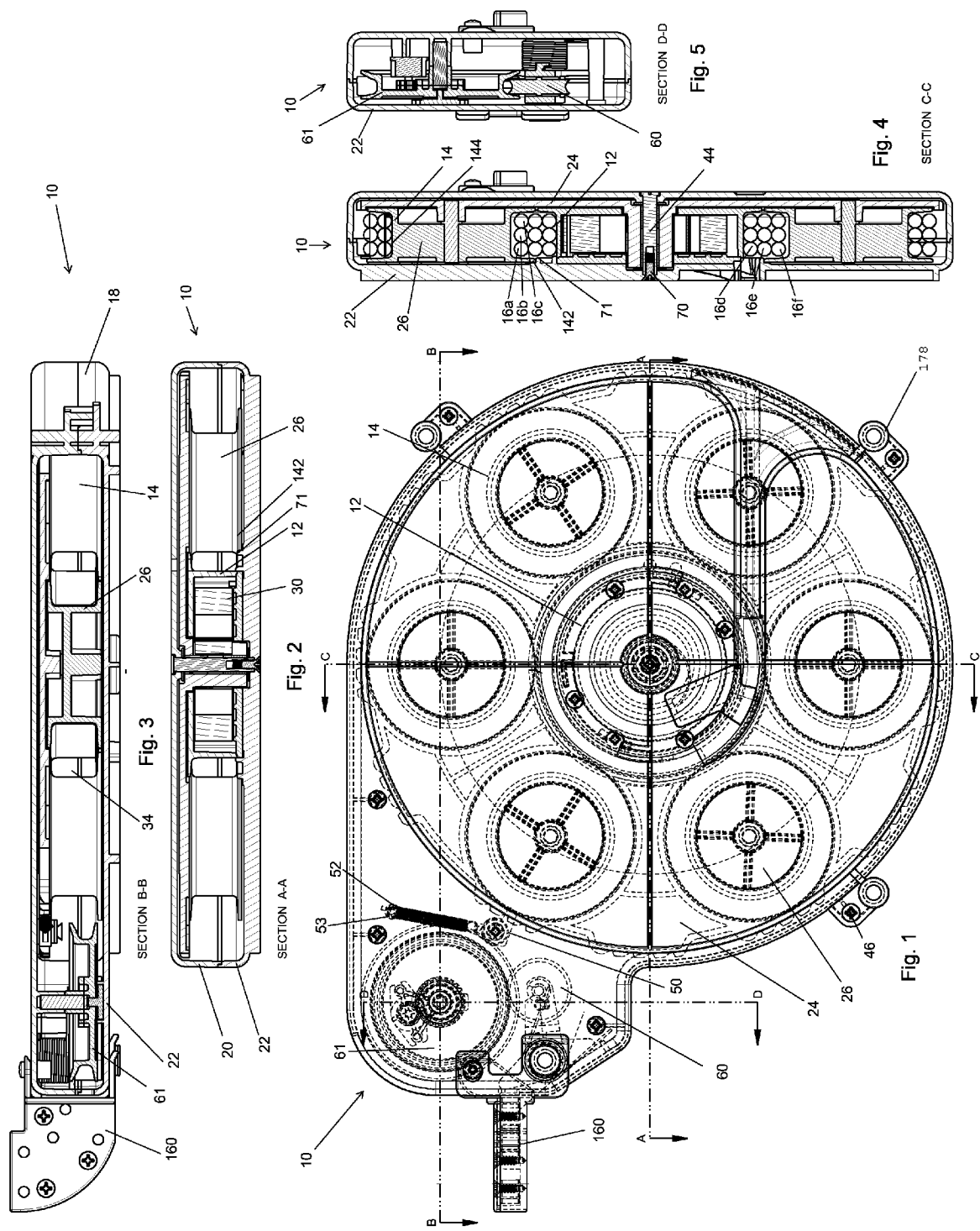

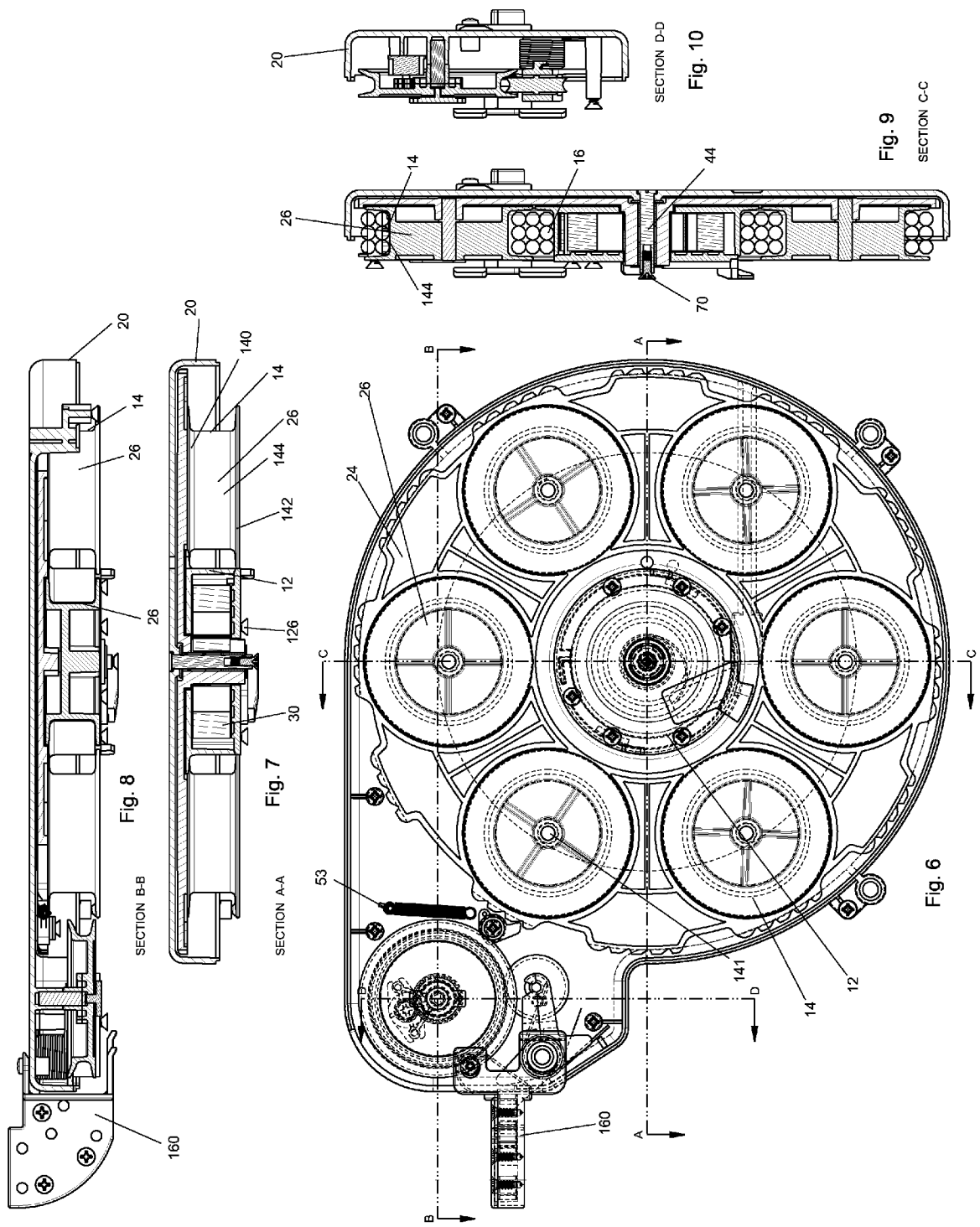

CABLE RETRACTOR

BACKGROUND OF THE INVENTION

The present invention relates to cable retractors, and more particularly to a device for extending and retracting a first end of a length of cable as the second end of the length of cable is held stationary.

One common type of cable retractor, known as a "slip ring" style cable retractor, includes a housing and a drum positioned within the housing. The drum is connected to a spring for urging the drum to rotate, and the cable is wound around the drum as the drum rotates. Slip rings are used to convey the electrical energy from the moving portion of the cable retractor, generally a portion of the drum, to a stationary portion of the cable retractor. Although relatively easy to use, these slip ring style cable retractors suffer from a number of disadvantages. First, they can be a safety hazard when used in environments where there is a possibility of a spark from the slip rings setting off an explosion, or the possibility of shorting by the slip rings coming into contact with moisture. In addition, they are not conducive to use with cables that require a large number of electrical conductors, such as HDMI or VGA cables because it can be highly complex to create the numerous connections with slip rings. They also cannot be used with cables that require fiber continuity, such as fiber optics.

One style of cable retractor that attempts to overcome the above noted shortcomings includes a stationary central drum surrounded by a plurality of outer rollers that are capable of revolving around the inner drum, such that retracted cable can be wound about the inner drum and an outer "drum" formed by the surfaces of the plurality of outer rollers. Examples of this style of cable retractor are shown in U.S. Pat. No. 6,375,109 to Liao and U.S. Pat. No. 4,132,367 to Meson. Both of these patents show examples of cables being wound into a housing around an inner drum and a series of planetary style outer rollers that orbit about the inner drum. This style of retractor enables extension and retraction of cable without the use of slip rings, but generally suffers in that they allow only a small payout of cable for a relatively large housing. The Meson device allows only side-by-side winding of the cable on the drums, which limits the amount of cable that can be retracted and/or requires a very large unit. The Liao device allows for overlapping layers of the cable, but does not enable side-by-side wrapping of the cable. Charging either of these devices to allow both side-by-side and overlapping winding of the cable would cause the device to bind during the retraction and/or extension of the cable. Further problems are caused by the fact that both of these devices require a tight bend in the cable at the location where the cable exits the central drum. Many commonly used cables see denigration in signal quality when the cables are bent to an amount that exceeds the cables minimum specified bend radius.

SUMMARY OF THE INVENTION

The present invention provides a cable retractor for use in a variety of applications, including in compact spaces, that is capable of extending and retracting a length of cable. In one embodiment, the cable retractor includes a housing forming an internal chamber and first and second drums within the chamber for winding of the cable. The first drum may include a stationary outer surface, and the second drum may be formed by a plurality of rollers mounted on a rotatable frame. The rollers may orbit about the first drum upon rotation of the frame, with each of the rollers also rotating about its own roller axis. The first and second drums may be sized to enable wrapping of the cable both side-by-side and in multiple layers about at least one of the first drum and the second drum. The ability to wrap the cable in multiple side-by-side wraps and in multiple layers on one or both of the first and second drums enables the cable retractor of the present invention to pay out a larger amount of cable than many previous styles and arrangements of cable retractors.

In one embodiment, the cable retractor includes a spring connected to the housing and the frame for biasing the frame to rotate in one direction and to retract the cable into the housing. A latch mechanism may be connected to the housing and the frame for selectively preventing the frame from rotation and thus enabling the user to pay out only a desired amount of the cable.

In another embodiment, the cable retractor includes structure to urge the rollers to rotate with respect to the frame as the frame rotates. For example, the housing may include a track, and a portion of each of rollers may engage the track during rotation of the frame, the engagement urging the rollers to rotate about the roller axes. The portion of the rollers may be frictionally engaged with the track, and capable of slipping with respect to the track to provide smooth extension and retraction of the cable even as multiple layers of cable are wound about the first and second drums.

In another aspect of the invention, the cable retractor includes an exit opening for a portion of the cable, and the exit opening is positioned adjacent to an outer edge of the first drum to enable the cable to exit from the cable retractor at a trajectory that is tangent to the first drum and thus without the need to fold or bend the cable beyond its specified minimum bend radius.

The cable retractor may additionally include a dampener that engages the cable to control the speed of the cable as the cable is wound around the second drum. The dampener may be a rotational dampening device connected to a dampening wheel, and the cable may be urged into engagement with the dampening wheel by a spring-loaded guide wheel.

These and other advantages and features of the invention will be more fully understood and appreciated by reference to the description of the current embodiments and the drawings.

BRIEF DESCRIPTION OF THE DRAWINGS

FIG. 1 is a top view of a cable retractor according to one embodiment of the present invention with features behind the housing cover shown in broken lines.

FIG. 2 is a side cross sectional view thereof taken along line A-A in FIG. 1.

FIG. 3 is a side cross sectional view thereof taken along line B-B in FIG. 1.

FIG. 4 is a side cross sectional view thereof taken along line C-C in FIG. 1.

FIG. 5 is a side cross sectional view thereof taken along line D-D in FIG. 1.

FIG. 6 is a top view of a cable retractor according to one embodiment of the present invention with the housing cover removed.

FIG. 7 is a side cross sectional view thereof taken along line A-A in FIG. 6.

FIG. 8 is a side cross sectional view thereof taken along line B-B in FIG. 6.

FIG. 9 is a side cross sectional view thereof taken along line C-C in FIG. 6.

FIG. 10 is a side cross sectional view thereof taken along line D-D in FIG. 6.

DESCRIPTION OF THE CURRENT EMBODIMENTS

Figure 11:
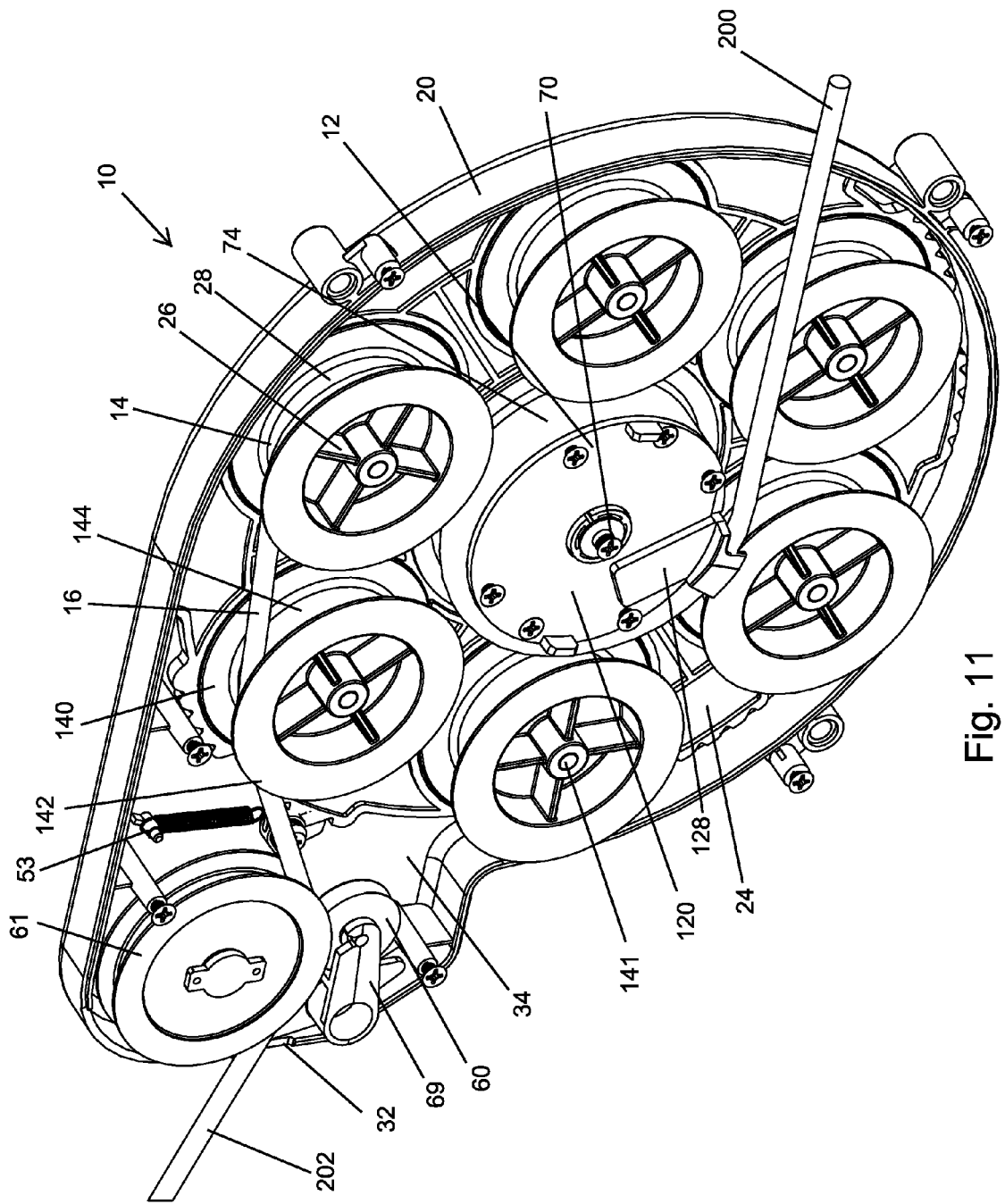
FIG. 11 is a front perspective view of a cable retractor according to one embodiment with the housing cover removed and a cable in a partially retracted position.

A cable retractor according to the current embodiments of the present invention is shown in the Figures and generally designated 10.

I. Overview

In general, the cable retractor includes first 12 and second 14 drums about which a cable 16 can be coiled and uncoiled. The drums 12, 14 may be mounted within a housing 18 having a main housing body 20 and a housing cover 22 that combine to form an enclosure. The first drum 12 is stationary, and the second drum 14 is supported on a rotating frame 24 to revolve about the first drum 12. The frame 24 may be connected to a spring 30 that biases the frame to rotate in one direction when the spring is loaded. The second drum 14 is formed from a plurality of individual rollers 26 can each rotate with respect to the frame 24 as the rollers 26 revolve about the first drum 12. One of the rollers 28 forms a guide roller for transferring the cable 16 from the second drum 14 to the first drum 12. As the frame 24 rotates in the one direction, the cable 16 is wrapped about the first drum 12 and the second drum 14 for storage within the housing 18. One end of the cable 16 may be pulled through an opening 32 in the housing to extend the cable 16 from the housing 18, thereby causing the frame to rotate in a second direction and uncoiling the cable 16 from the first 12 and second 14 drums.

II. Structure

Figure 18:
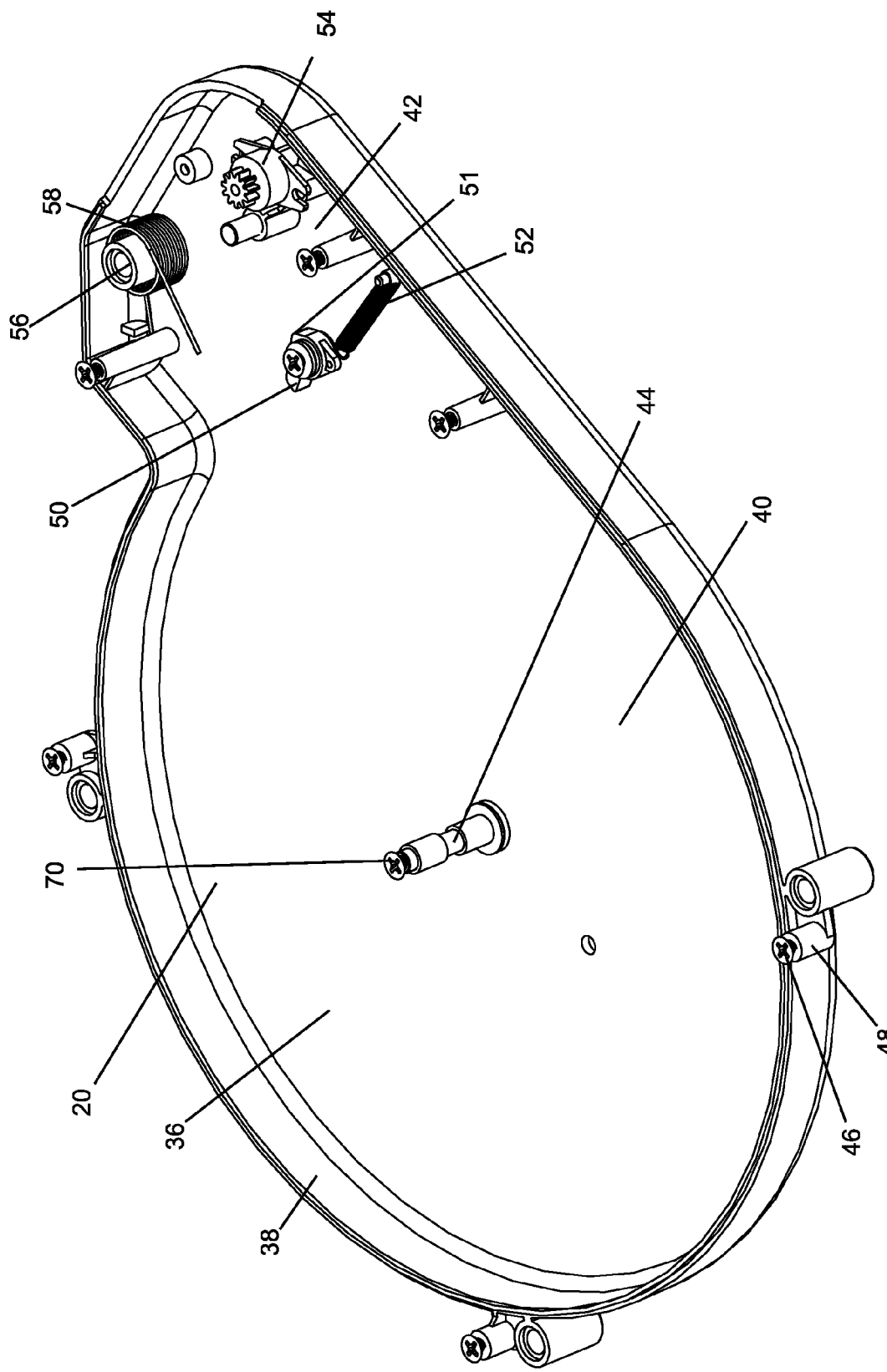
FIG. 18 is a front perspective view of the housing.

The housing 18 may be formed as a shell, with the main housing body 20 forming a first shell portion and the housing cover 22 forming a second shell portion that can mate with the first shell portion to form an inner chamber 34. Referring to FIG. 18 the main housing body 20 includes a bottom wall 36 and a sidewall 38 extending upwardly from the peripheral edge of the bottom wall 36 substantially around the entire periphery of the bottom wall 36. In the illustrated embodiment, the main housing body 20 is shaped to include a generally circular portion 40 and an extension portion 42 extending from the generally circular portion 40. In one embodiment, a frame axis post 44 extends upwardly from the bottom wall 36 generally in about the center of the circular portion 40. A plurality of screw bosses 48 extend from the sidewall 38 for receiving fasteners 46 to connect the main housing body 20 to the housing cover 22. In the illustrated embodiment, a latch, such as a pawl 50 is pivotally attached to the bottom wall 36 within the extension portion 42. The latch or pawl 50 may be biased in the illustrated position by a spring 52 connected between the pawl 50 and post 53. In one embodiment, a cam 51 extends from the pawl 50. In addition, a rotary dampener 54 is mounted to the main body 20 within the extension portion 42. As described in more detail below, the rotary dampener 54 may control the speed of the cable 16 as the cable is retracted into the housing 18. Also as illustrated, a post 56 extends upwardly from the bottom wall 36 to support a coil spring 58 for biasing a roller 60, discussed below, against the cable 16.

Figure 19:
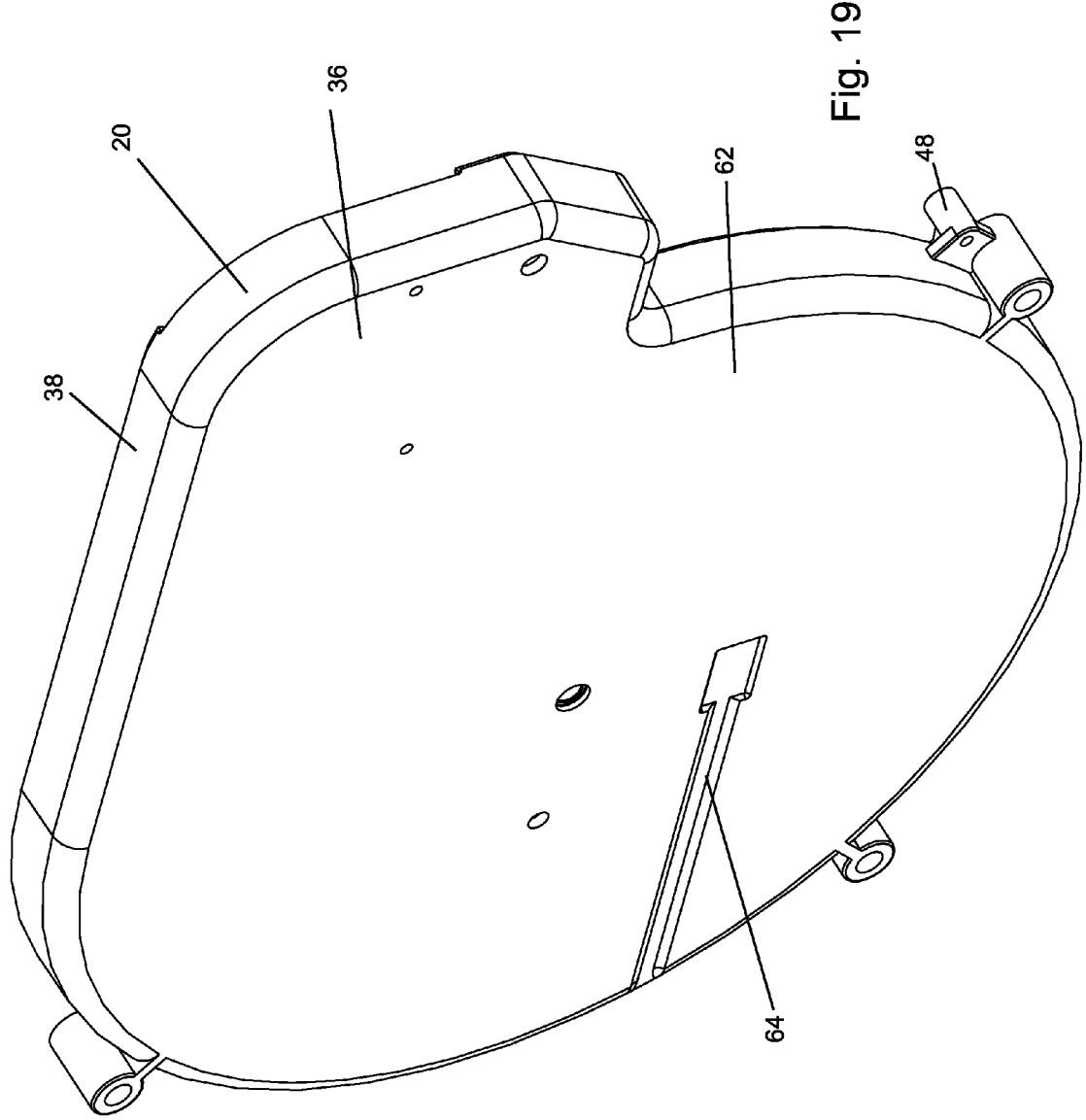
FIG. 19 is a rear perspective view of the housing.
Figure 20:
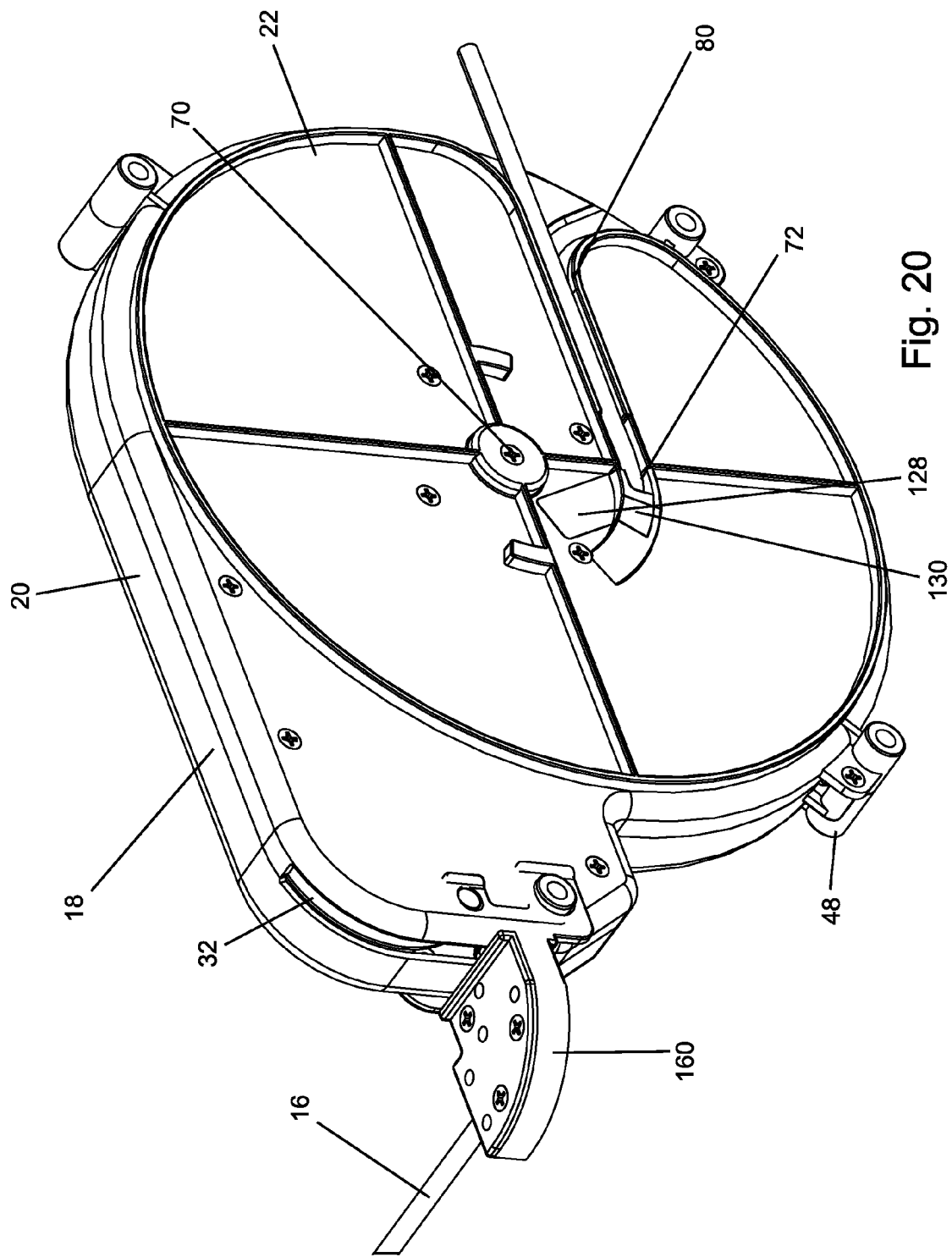
FIG. 20 is a front perspective view of the cable retractor including a cable guide.

As shown in FIG. 19, in one embodiment, the external surface 62 of the bottom wall 36 may define a cutout 64. The cutout 64 may be used for receiving a portion of an adjacent cable retractor 10 when it is desired to stack more than one cable retractor 10 together.

Figure 22:
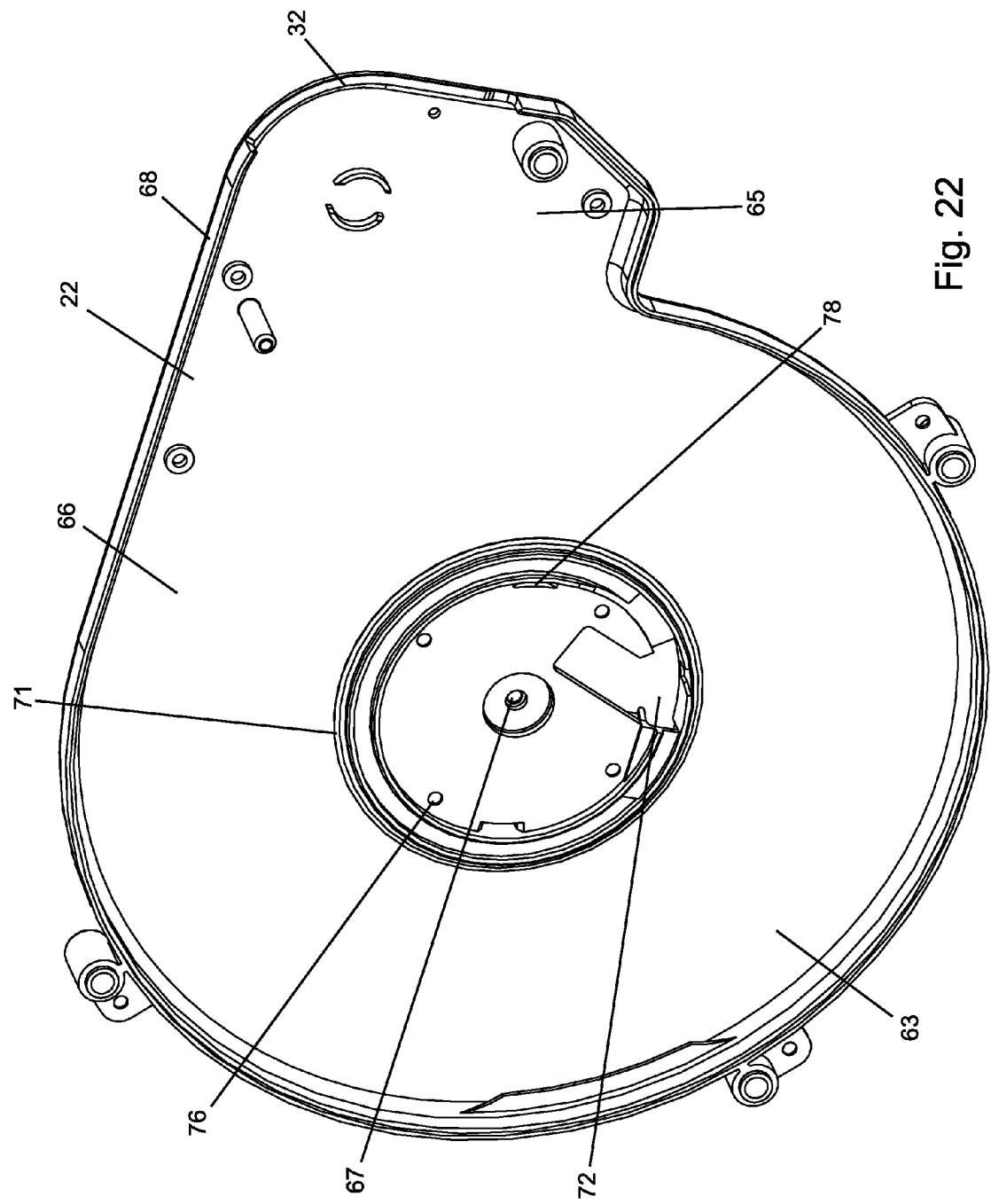
FIG. 22 is a rear perspective view of the housing cover.
Figure 23:
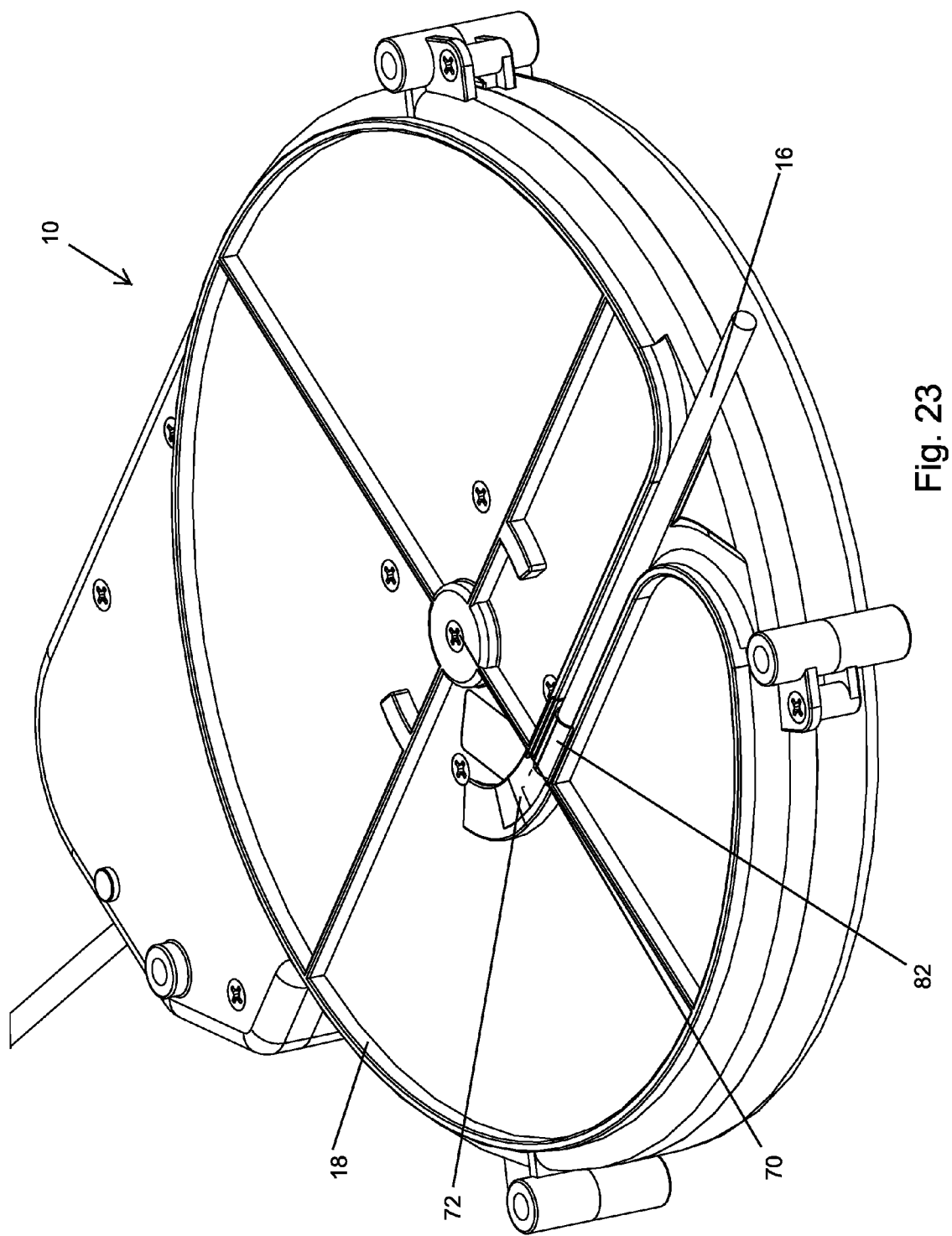
FIG. 23 is a front perspective view of the cable retractor.

One embodiment of the housing cover 22 is shown in FIG. 22. As illustrated, the cover 22 includes a top wall 66 and a sidewall 68 extending from the top wall 66 around substantially the entire periphery of the top wall 66. In order to match the shape of the housing main body 20, the cover 22 generally includes a circular portion 63 and an extension portion 65. A fastener hole 67 may be positioned in the center of the circular portion 63 for receiving a fastener 70 that extends into the frame axis post 22 extending from the housing main body 20. In one embodiment, the cover 22 defines a first opening 32, formed as a cutout in the sidewall 38 located in the extension portion 65. The first opening 32 may be elongated to enable the cable 16 to extend from the cable retractor 10 at a variety of angles. The cover 22 defines a second opening 72 that, as described in more detail below, is offset from the fastener hole 67 and positioned to be adjacent to an outer surface 74 of the first drum 12 to enable passage of the cable 16 through the second opening 72 at a trajectory that is tangent to the outer surface 74 of the first drum 12. In one embodiment, the opening 72 may also be sized to receive a portion of the first drum 12 extending there through. In one embodiment, the cover also includes a series of fastener holes 76 spaced apart about the central hole 67, and a pair of diametrically opposed notches 78 on either side of the central hole 67.

The cover 22 may further include a track 71 extending from the top wall 66. In the illustrated embodiment, the track 71 is a generally circular track that extends outwardly from the top wall 66 a distance that, in one embodiment, is less than the height of the sidewall 68. The track 71 may be coaxial with the fastener hole 67, and may surround the second opening 72 and fastener holes 76.

Figure 24:
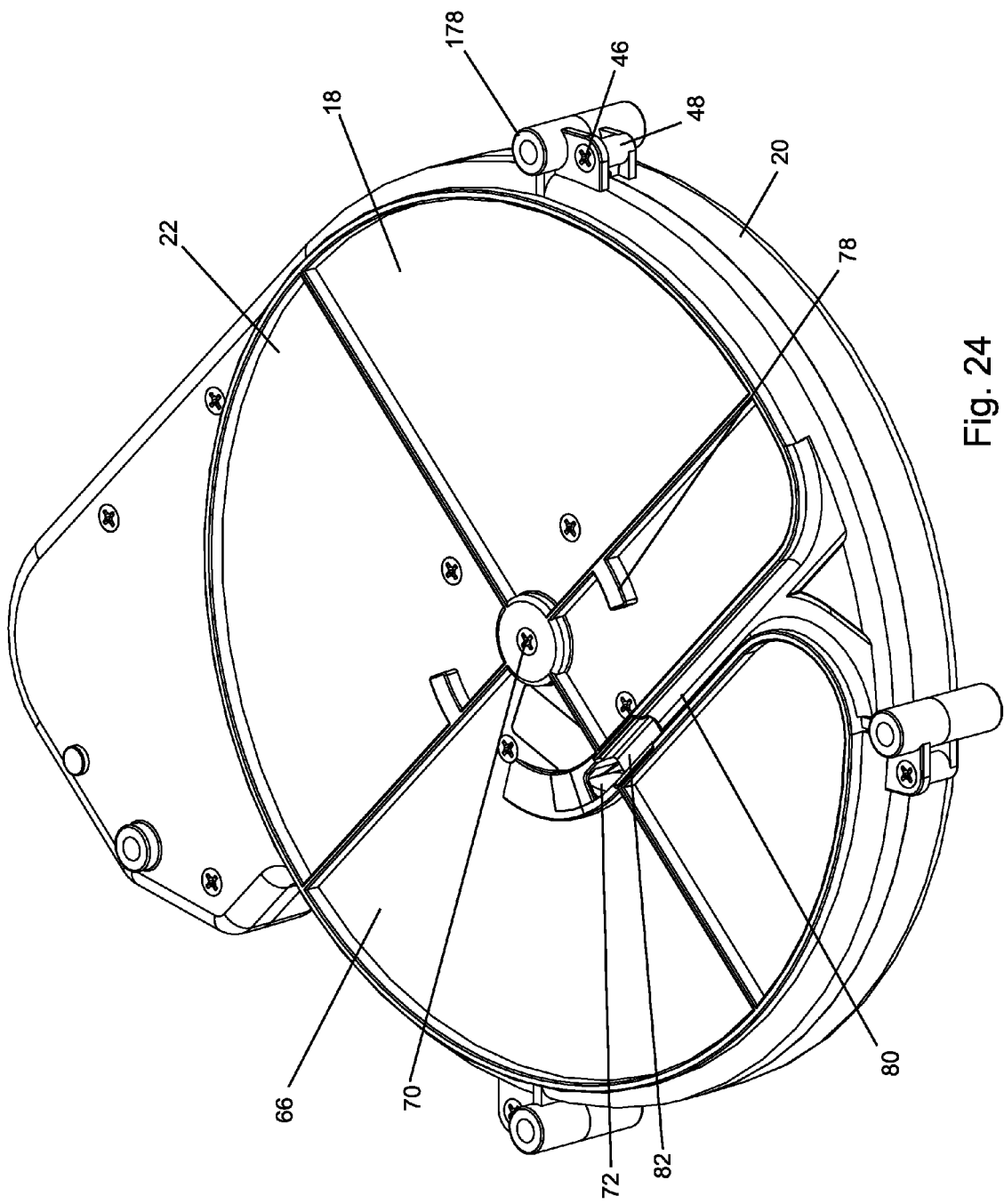
FIG. 24 is a front perspective view of the cable retractor with the cable removed.

Referring now to FIG. 24, the outer surface of the top wall 66 may define a cable guide channel 80 for routing the cable 16 through the second opening 72. In one embodiment, the top wall 66 or the channel 80 may include structure for securing the cable 16 to the housing 18 or to another portion of the cable retractor 10. As illustrated, the cable securing structure includes a section of hook-and-loop fastener 82 positioned in the channel 80. The section of hook-and-loop fastener 82, or another type of fastener or adhesive, could be positioned at any location along the channel 80, or at a different location on the housing 18 or the cable retractor 10 to secure the cable 16 to the device 10.

Figure 17:
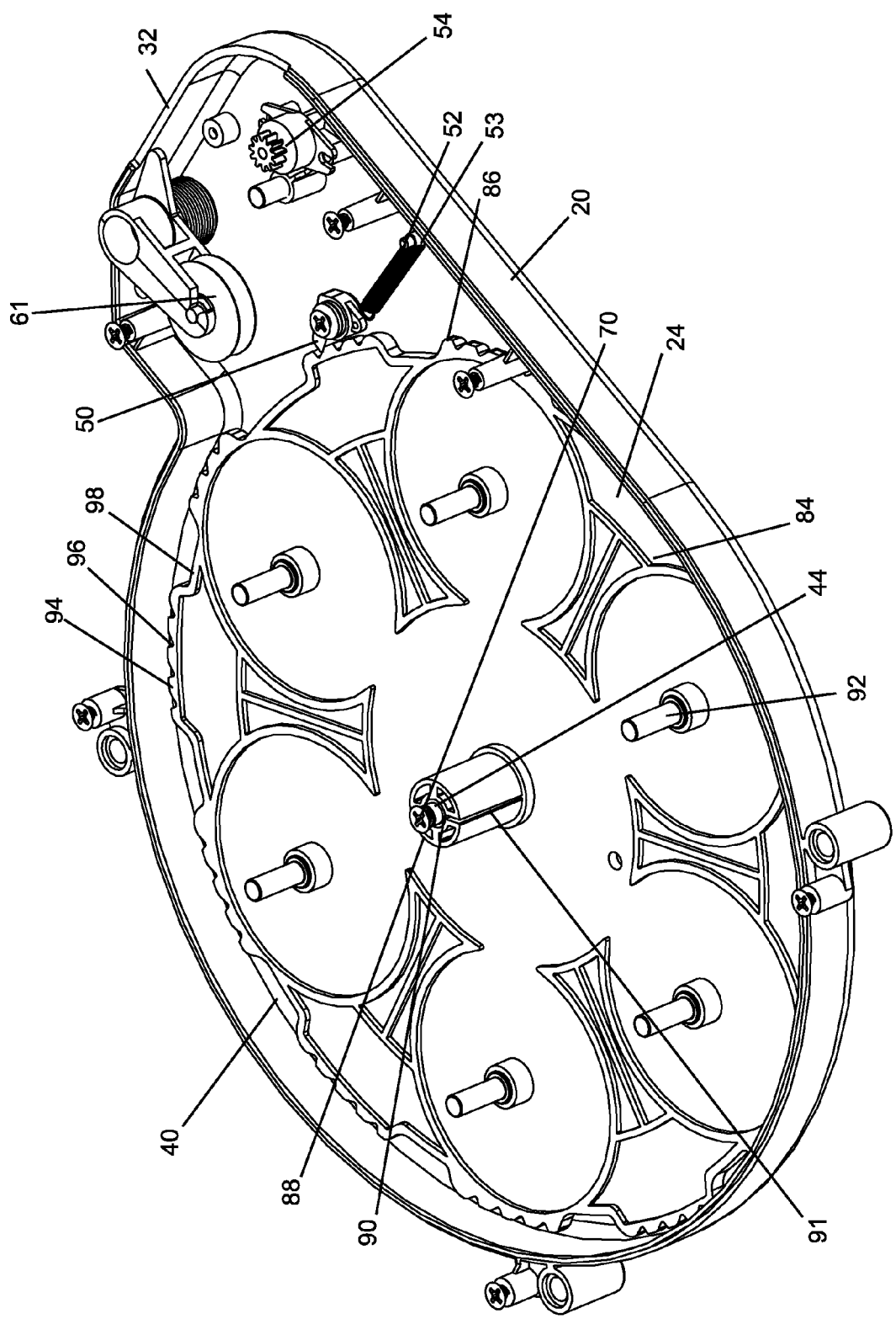
FIG. 17 is a front perspective view of the housing and rotatable frame.

Referring now to FIG. 17, in one embodiment, a rotatable frame 24 is mounted to the main housing body 20 such that it is capable of rotating with respect to the housing 18. As shown, the rotatable frame 24 includes a generally circular plate 84 having a generally circular peripheral edge 86 that is sized approximately the same as the circular portion 40 of the main housing body 20. The plate 84 further includes a central post 88 defining an aperture 90 extending there through and a notch 91 extending into the post 88 to form a first spring catch, and a series of roller posts 92 extending outwardly from the frame 24 and spaced apart from each other in a circular pattern around the central post 88 with each roller post 92 spaced at the same distance from the central post 88. As shown in FIG. 17, the frame 24 may be mounted to the housing main body 20 by inserting the frame axis post 44 through the aperture 90, such that the frame axis post 40 forms an axis about which the frame 24 can rotate.

In one embodiment, the peripheral edge 86 of the frame includes structure to interact with the pawl 50 for controlling the rotation of the frame 24 and ultimately controlling the extension and retraction of the cable 16. As illustrated, the peripheral edge 86 includes segments 94 of spaced notches 96 separated by troughs 98. The notches 96 are shaped and positioned with respect to the pawl 50 such that when the pawl 50 falls into any one of the notches 96, the frame 24 is prevented from being rotated in one direction (i.e., in the illustrated embodiment, the clockwise direction). The troughs 98 are provided with a depth greater than the length of the pawl 50, such that when the frame 24 is rotated to a position with the pawl 50 aligned with a trough 98, the pawl 50, with the urging of the spring 52, flips in the opposite direction. In this flipped position, the frame 24 is permitted to rotate in the clockwise direction until the rotation of the frame 24 is reversed, the pawl 50 is flipped, and the frame 24 is once again prevented from rotating in the clockwise direction. In this manner, a selected amount of cable 16 can be drawn from the cable retractor 10 with the frame 24 rotating in a clockwise direction. When a selected amount has been paid out, the direction of the frame 24 rotation can be reversed until the pawl 50 is flipped and retained in one of the notches 96.

Figure 12:
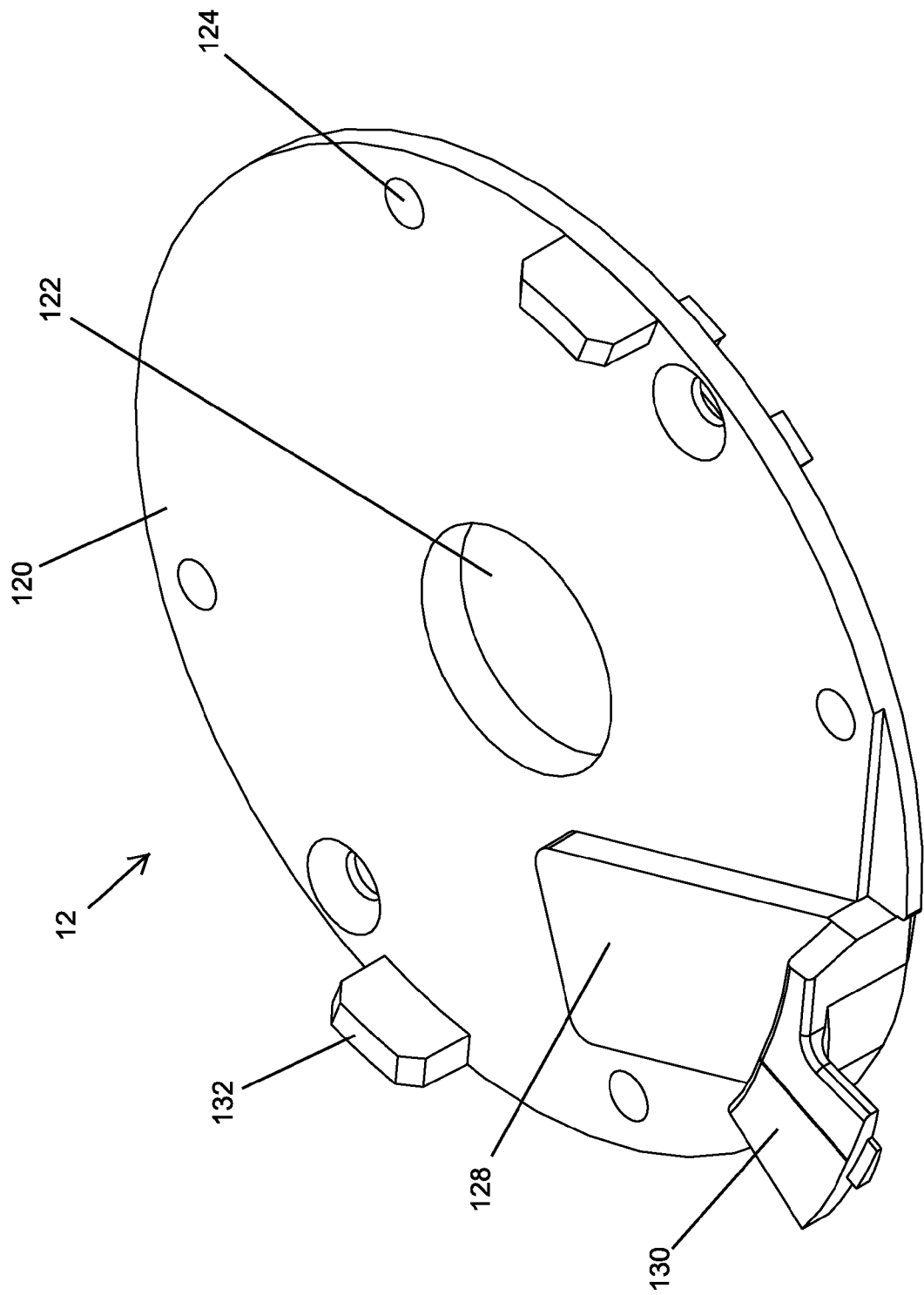
FIG. 12 is a front perspective view of the first drum cover.
Figure 13:
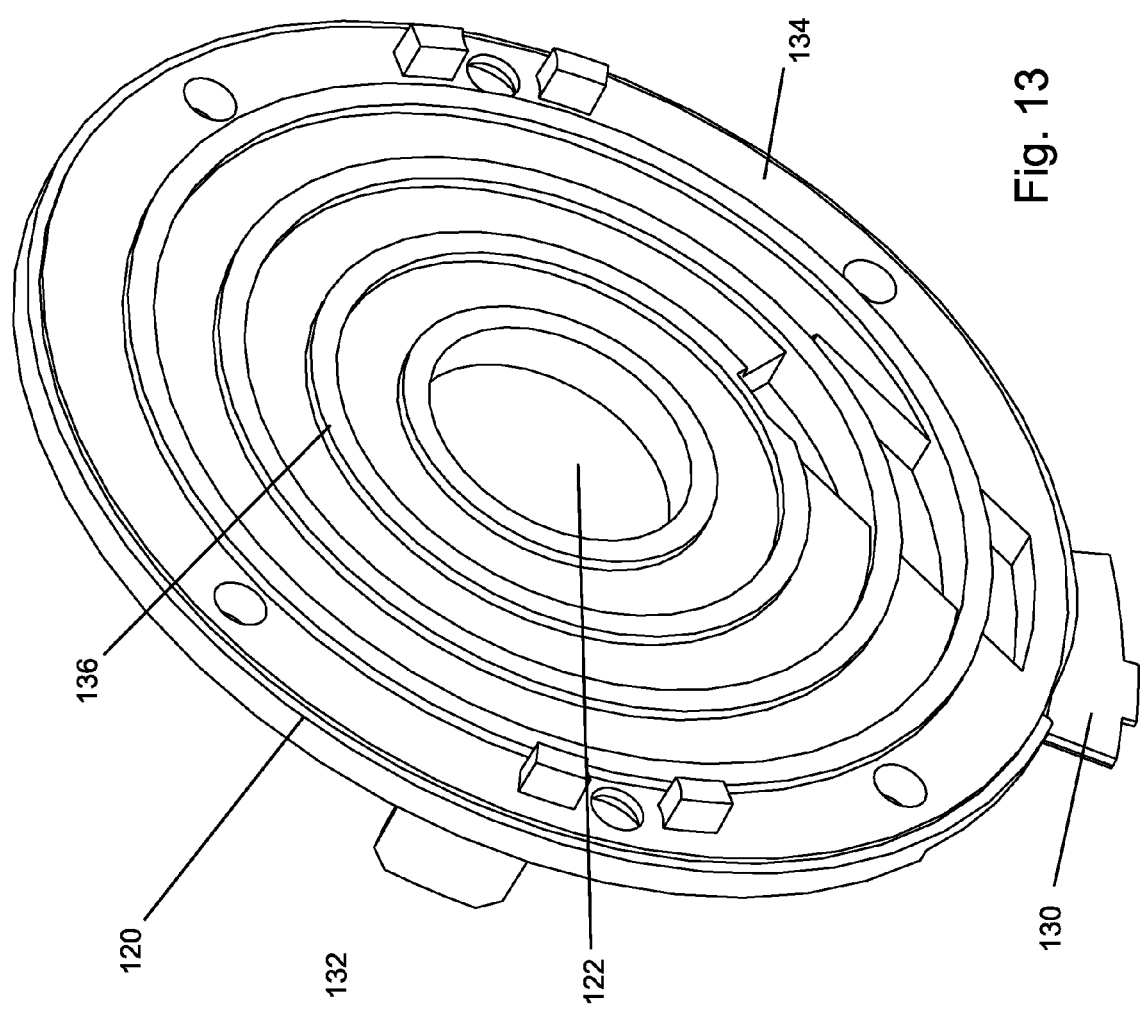
FIG. 13 is a rear perspective view of the first drum cover.
Figure 14:
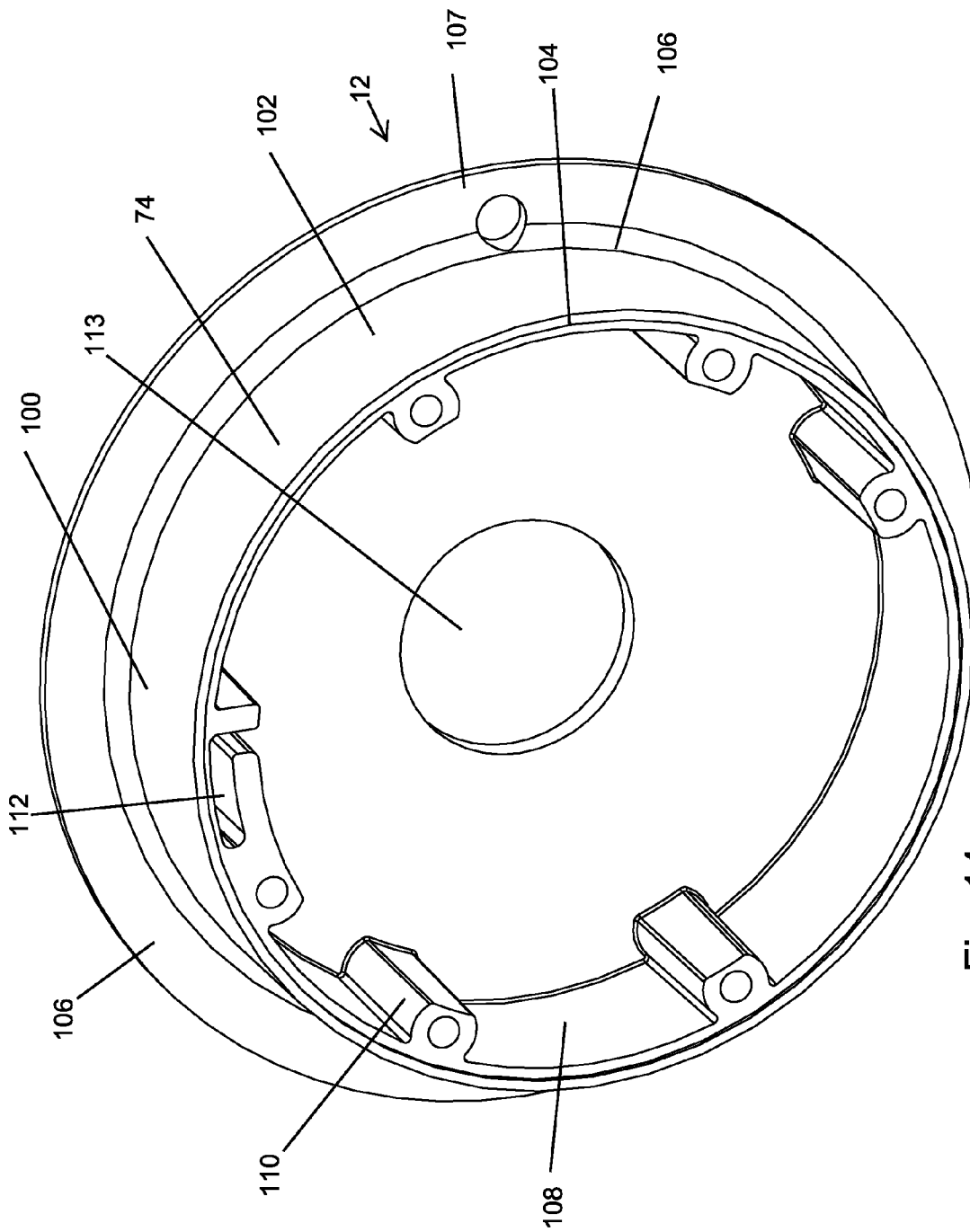
FIG. 14 is a front perspective view of the first drum.
Figure 15:
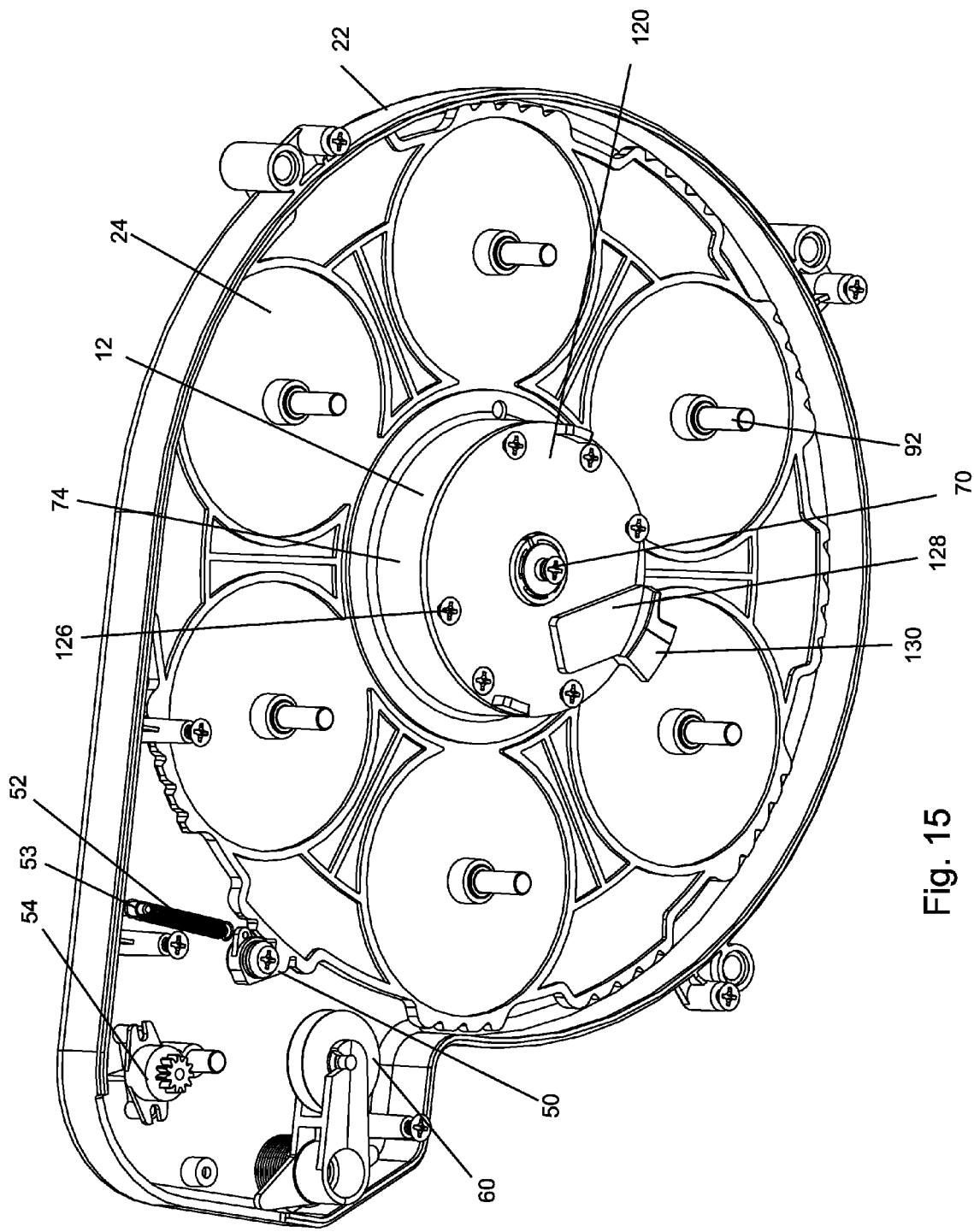
FIG. 15 is a front perspective view of the cable retractor with the rollers and housing cover removed.

Referring now to FIGS. 12-17, the first drum 12 is mounted between the frame 24 and the housing cover 22 such that the first drum 12 is stationary with respect to the housing 18. FIG. 14 shows a first portion 100 of the first drum 12, which includes a cylindrical sidewall 102 having an upper edge 104 and a lower edge 106 that define a width therebetween. The sidewall 102 further includes an outer surface 74 and an inner surface 108. A plurality of screw bosses 110 extend from the inner surface 108, as well as a second spring catch 112. A flange 107 extends from the lower edge 106 for engagement with the frame 24. In the illustrated embodiment, the first portion defines a hole 113 for receiving the central post 88 of the frame 24.

Figure 16:
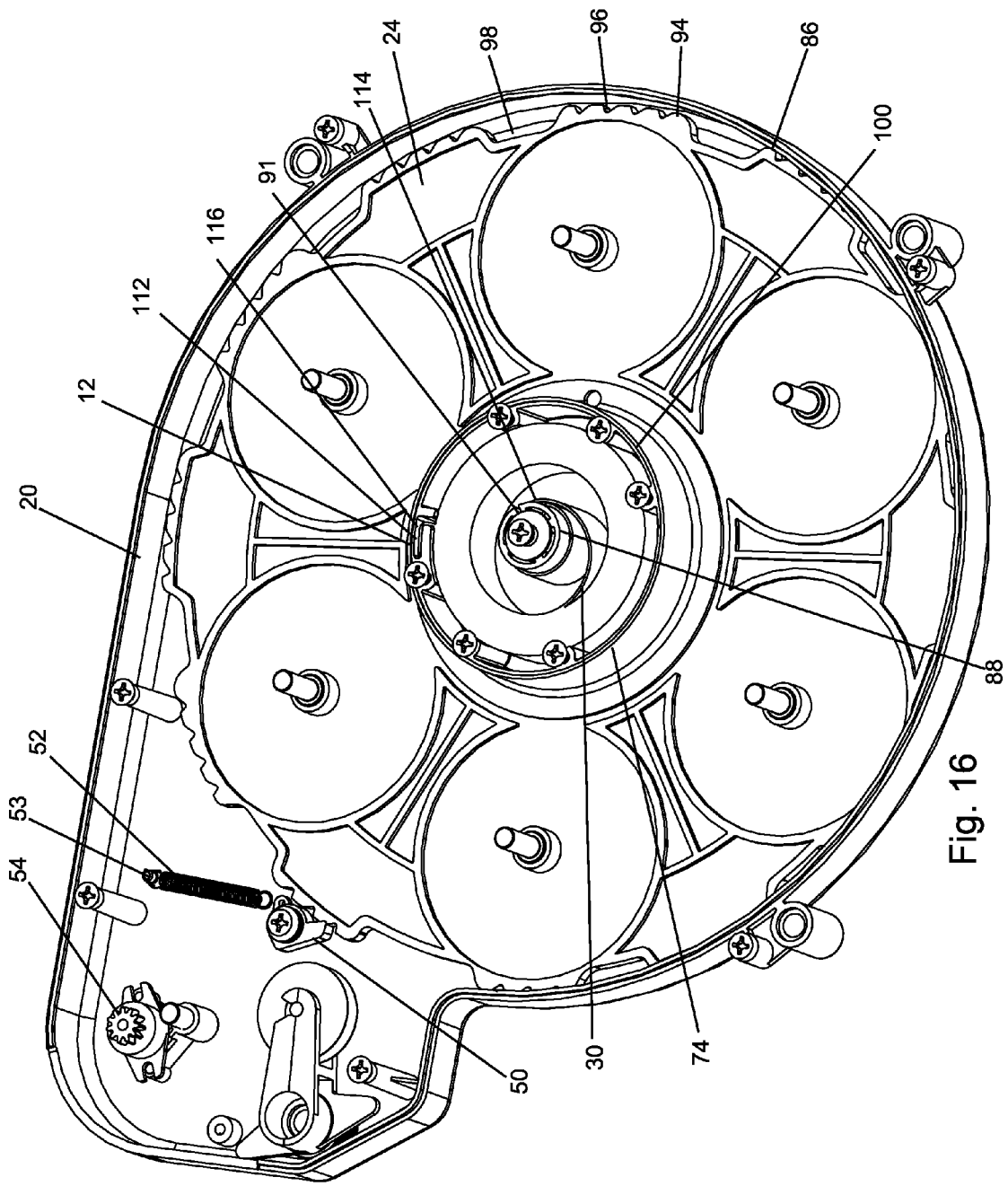
FIG. 16 is a front perspective view of the cable retractor with the rollers, housing cover and first drum cover removed.

FIG. 16 shows the first portion 100 of the first drum 12 positioned in the housing 18 with a spring 30 positioned within the first drum 12. In the illustrated embodiment, the spring 30 is a spiraled coil spring that is connected between the first drum 12 and the frame 24 such that the frame 24 is biased to rotate in one direction (i.e., the spring 30 provides a force against rotation of the frame 24 in the counterclockwise direction and tends to urge the frame 24 to rotate in the clockwise direction). The spring 30 may include a first spring end 114 and a second spring end 116, and the spring 30 may be connected between the frame 24 and the first drum 12 by inserting the first spring end 114 into the first spring catch 91 in the central post 88 of the frame 24 and inserting the second spring end 116 into the second spring catch 112 in the first drum 12. Although a spiraled coil spring is shown in the illustrated embodiment, other types of springs may otherwise be disposed between the frame 24 and housing 18.

As shown in FIGS. 12 and 13, the first drum 12 includes a second portion 120 that forms a cover for the first portion 100 and secures the first drum 12 to the housing cover 22 to prevent rotation of the first drum 12 as the frame 24 rotates. In the illustrated embodiment, the second portion 120 is a generally circular plate sized to cover the interior of the first portion 100. The second portion 120 includes a central hole 122 for receiving the central post 88 of the frame, and a series of spaced apart fastener holes 124 for receiving fasteners 126 that extend through the housing cover 22, through the second portion 120, and into the first portion 100. In one embodiment, the second portion 120 further includes a generally rectangular raised protrusion 128 and a cable flange 130 which are shaped to extend through the second opening 72 and to interfit within the second opening 72. The flange 130 may function to guide the cable 16 through the second opening 72 and into the channel 80, and the rectangular protrusion may function to orient the first drum 12 with respect to the housing cover 22 and to further prevent rotation between the first drum 12 and the housing cover 22. A pair of opposing protrusions 132 may also extend from the second portion 120 to interfit with the housing cover 22. FIG. 13 shows a lower surface 134 of the second portion 120, which may include one or more ring shaped protrusions 136 for interfitting with the spring 30.

The rollers 26 are mounted on the frame 24 for revolving with the frame 24 about the first drum 12 upon rotation of the frame 24, and for rotation with respect to the frame 24. In one embodiment, each roller 26 is generally cylindrical and includes a base flange 140, an outer flange 142 and a sidewall 144 extending between the base flange 140 and the outer flange 142. As shown in FIGS. 4 and 9, the width of the sidewall 144 between the base flange 140 and the outer flange 142 may be sufficient to enable multiple side-by side wraps (16a, 16b, 16c) of the cable 16 onto the roller 26. Each roller 26 includes a central aperture 141. Each roller 26 may be mounted to the frame 24 by inserting one of the roller posts 92 through the central aperture 141 of the roller 26 such that the roller 26 is capable of rotating about a roller axis defined by the roller post 92. In this way, each of the rollers 26 is capable of rotating with respect to the frame 24.

In one embodiment, the cable retractor may include structure that urges the rollers 26 to rotate with respect to the frame 24 when the frame 24 rotates. As shown, for example, in FIGS. 2 and 4, the outer flange 142 of each roller 26 and the track 71 on the housing cover 22 may be sized such that they are in contact when the housing cover 22 is attached to the main housing body 20 and/or when the frame 24 is caused to rotate. In one embodiment, this engagement may be a frictional engagement between a generally smooth surface of the flanges 142 and a generally smooth surface of the track 71. In this way, the frictional engagement of between the flanges 142 and the track 71 can urge the rollers 26 to rotate in unison as the frame 24 is caused to rotate; however, because the engagement is only a frictional engagement, one or more rollers 26 may slip with respect to the track 71 such that the one or more rollers 26 does not rotate with the track 71 for at least a short period of time. For example, one or more of the rollers 26 may slip with respect to the track 71 if there is sufficient force on one or more of the rollers 26 to counter act the frictional engagement—such as the force cause by the cable 16 wrapped around the outside of the rollers 26 at certain times during the extension and retraction of the cable 16. In another example, one or more of the rollers 26 may slip with respect to the track 71 if the force between the rollers 26 and the track 71 is reduced—such as by flexing of the frame 24 that may reduce the contact force between the track 71 and rollers 26. In one embodiment, the circular plate portion 84 of the frame 24 may be caused to flex in the manner of a potato chip when an amount of cable 16 is wrapped around the second drum 14 (i.e., the outer surfaces of the rollers 26). This flexing may push the rollers 26 into engagement with the track 71 and increase the frictional engagement that urges the rollers 26 to rotate. Likewise, as the cable 16 is unwrapped from the second drum 14, the flexing of the frame 24 may decrease and thus reduce the frictional engagement between the track 71 and rollers. At the same time, the forces caused by the flexing of the frame 24 may be counteracted by the forces resulting from wrapping of the cable 16 that tend to cause the cable to rotate as a single unit about the second drum 14 and prevent the rollers 26 from rotating. These forces generally result from the cable 16 having been wrapped tightly and in multiple overlapping layers (see FIG. 4) such that the various layers of cable (16d, 16e, 16f) have different diameters with different rates of rotation that tend to bind the cable 16 against the rollers 26. The nature of the illustrated embodiment, with frictional engagement between portions of the rollers 26 and portions of the housing 18, creates a proper balance between the urging of the rollers 26 to rotate and allowing of the rollers 26 to slip that enables extension and retraction of multiple overlapping layers of cable 16 onto the first 12 and second 14 drums. In an alternative embodiment, other structures may be used for urging the rollers 26 to rotate, such as gearing structure on the rollers 26 and portions of the housing 18.

Figure 21:
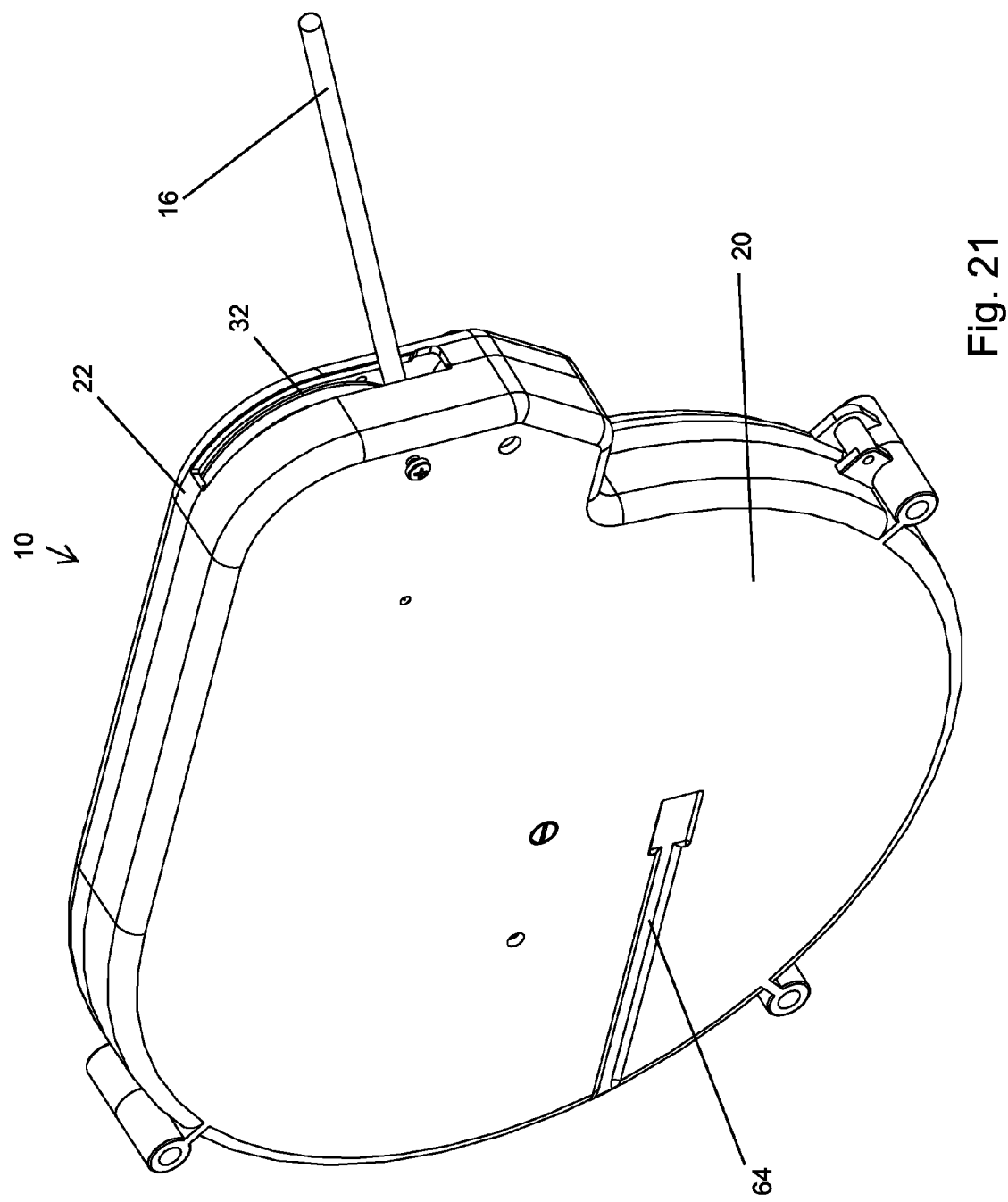
FIG. 21 is a rear perspective view of the cable retractor.
Figure 25:
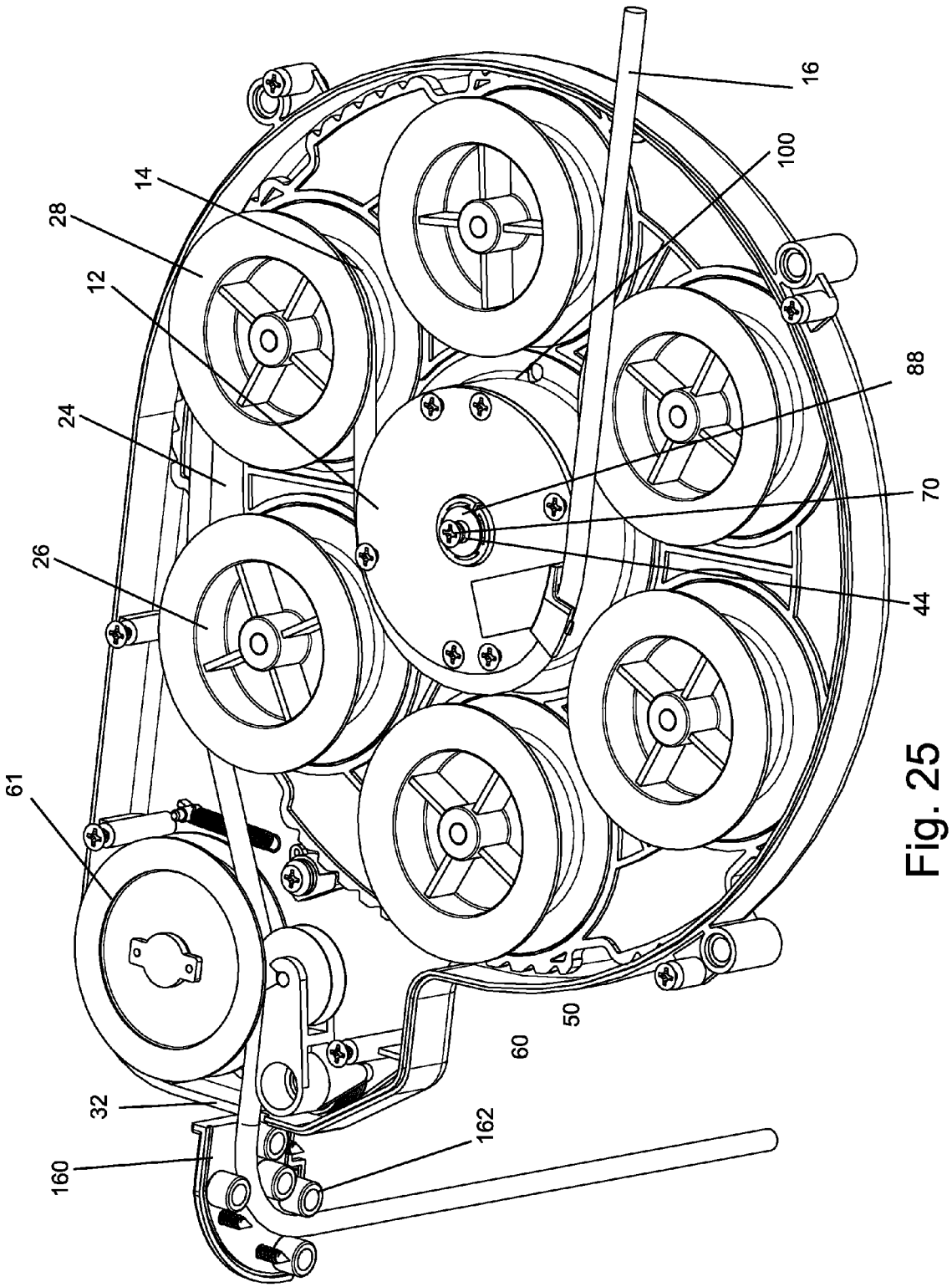
FIG. 25 is a front perspective view of the cable retractor with the cover removed and including a cable guide.

According to the current embodiments, the cable retractor 10 may include various structures for routing the cable 16 through the first opening 32 for enabling the cable 16 to extend and retract through the opening 32. As shown, for example, in FIG. 11, a pair of rollers 60, 61 may be positioned within the extension portion 42, such that the cable 16 can be routed through the rollers 60, 61 as it exits the first opening 32. In one embodiment, one of the rollers 61 includes a conventional rotary dampener 54 for controlling the speed of the cable 16 as it is extended and retracted. The other roller 60 is mounted on a swivel arm 69 connected to coil spring 58. This roller 60 is biased by the spring 58 against the cable 16 to pinch the cable 16 between the rollers 60, 61 and maintain tension on the cable 16. In another embodiment, one or both of the rollers 60, 61 could be removed. Referring to FIGS. 11 and 21, in one embodiment, the cable is routed from the rollers 60, 61 through the opening 32. The elongated opening 32 enables pulling the cable 16 through the opening 32 at a relatively wide range of angles. In another embodiment, shown, for example, in FIG. 25, a cable guide 160 is attached to the housing 18 adjacent to the first opening 32. In the FIG. 25 embodiment, the cable guide 160 is used to guide the cable 16 through about a 90 degree turn. As shown, the cable guide 160 includes a plurality of rollers 162 for routing the cable 16 through the cable guide 160. The use of multiple small rollers 162 as shown can prevent the cable 16 from being bent at a radius that is tighter than the specified minimum bend radius of the cable 16 without taking up the large amount of space that would otherwise be used by a single, larger roller.

Figure 26:
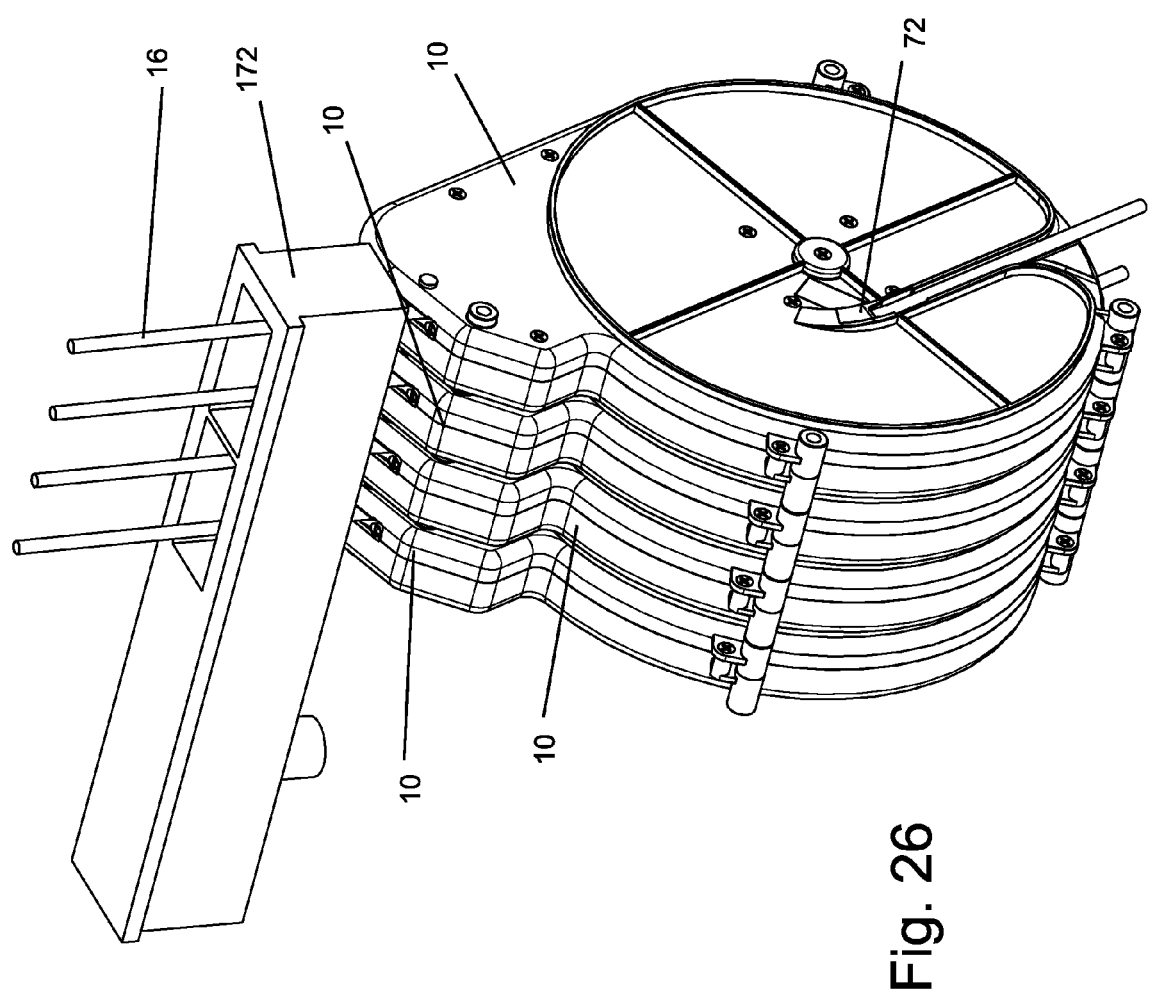
FIG. 26 is a view of multiple stacked cable retractors.
Figure 27:
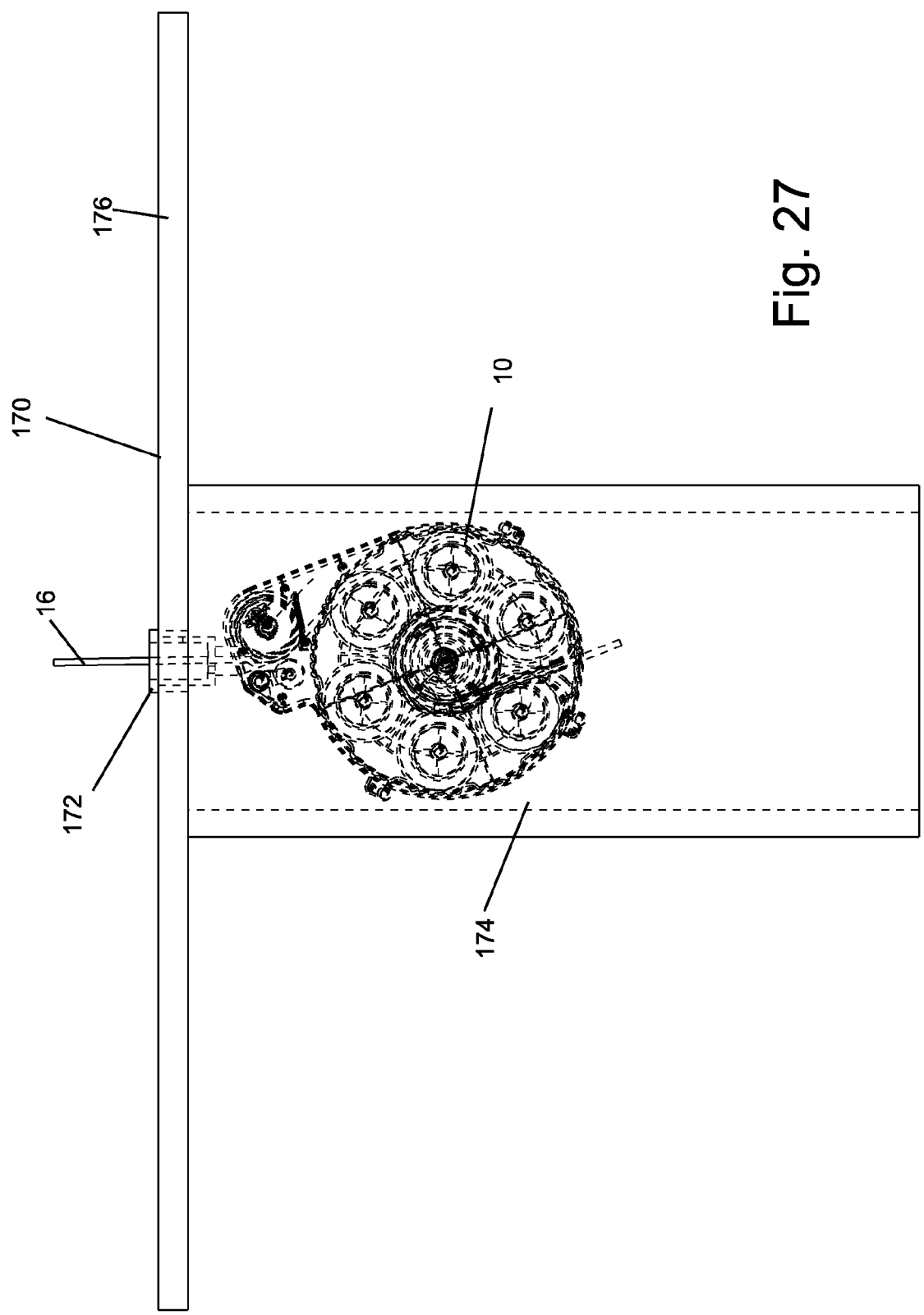
FIG. 27 is a side of a cable retractor table with a cable retractor shown in broken lines and mounted within a table support.
Figure 28:
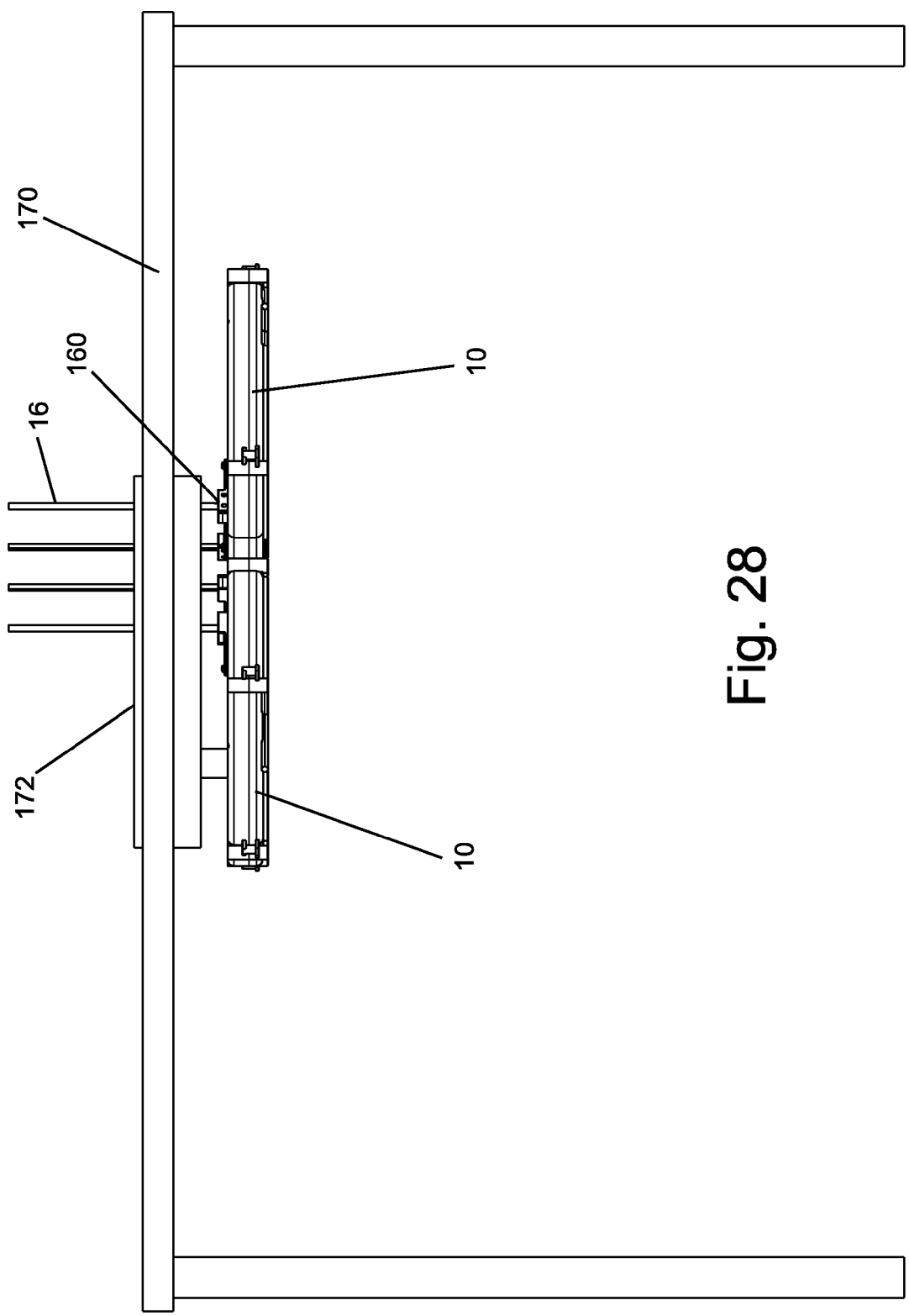
FIG. 28 is a side view of a table with multiple cable retractors mounted to the undersurface of the table.
Figure 29:
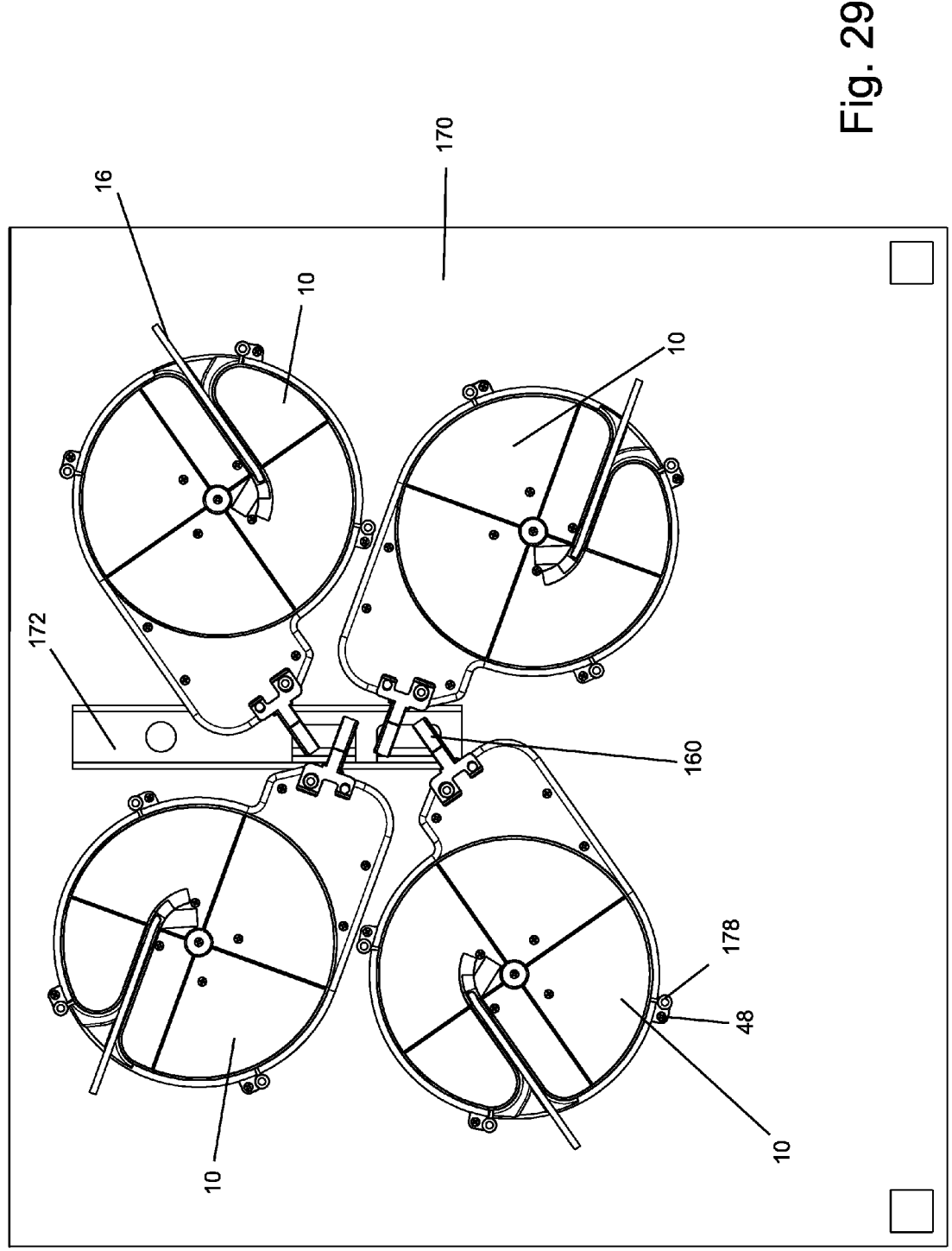
FIG. 29 is a bottom view of the cable retractors mounted to an undersurface of a table.

FIGS. 26-29 show examples of some of the potential uses of the cable retractor 10 in connection with a table, such as a conference table 170. FIG. 26 shows how multiple cable retractors 10 according to the current embodiments may be stacked together, with the cables 16 routed through an insert 172 of the type typically mounted within a table surface. FIG. 27 shows a cable retractor (which could be one of a set of stacked cable retractors 10) positioned within the support structure 174 of a table 170 with the cable 16 routed through the insert 172 and table surface 176. FIGS. 28 and 29 show a different mounting application for a table 170 that includes the use of a cable guide 160. In this embodiment, multiple cable retractors 10 are mounted to the underside of a table surface 176 with their housings 18 generally parallel to the table surface 176 and the cable guides 160 routing the cable 16 from the first opening 32 and through the insert 172. A variety of additional mounting arrangements could otherwise be used, with or without a cord guide 160, for mounting one or more cable retractors 10 to a table or another structure, depending on the desired application. In each of these embodiments the cable retractor may be mounted to a structure using many different types of conventional fasteners and techniques. In one embodiment, fasteners may extend through screw bosses 178 mounted to the housing 18 adjacent to the screw bosses 48.

A variety of cables 16 could be used in connection with the cable retractor 10, including HDMI cables, VGA cables, fiber optic cables as just some examples. These cables generally include first and second ends, which may include connectors. One of the benefits of the present invention is that it enables use of standard cables, with standard ends. The cables 16, regardless of cable type, can be purchased off the shelf and inserted into the cable retractor 10 without alteration of the cable 16 or the cable connectors.

II. Operation

Operation of the cable retractor 10 includes, as an initial step, removing the housing cover 20 and inserting the cable 16 into the cable retractor 10. As shown in FIG. 11, with the housing cover 22 removed, the cable 16 may be inserted by: (a) routing a portion of the cable 16 nearer to the first end 200 underneath the cable flange 130 on the first drum 12, (b) winding the cable 16 around a portion of the first drum 12, (c) winding the cable 16 around the one of the rollers 26 that functions as a guide roller 28, and (d) extending the cable 16 over one or more additional rollers 26 and towards the first opening 32, extending the cable 16 between the rollers 60, 61 and (e) extending the cable through the first opening 32. The cable 16 may be wound in this manner with the spring 30 held in a wound state, such that a release of the spring 30 would cause unwinding of the spring 30 and cause the frame 24 to rotate in a clockwise direction to retract the cable 16.

After the cable 16 has been initially wound, the housing cover 22 can be attached to the housing main body 22 using the fasteners 46 extending into the plurality of screw bosses 48. As the housing cover 22 is attached, the first end 200 of the cable 16 may be routed through the second opening 72 in the housing cover 22. In order to hold the first end 200 of the cable 16 securely in place, the cable 16 may be connected to the housing cover 22 with the cable securing structure. For example, a section of hook-and-loop fastener 81 placed on the cable 16 may be interfitted with the section of hook-and-loop fastener 82 positioned in the channel 80, and the second end 200 of the cable (or a portion of the cable 16 near the second end 200) may be positioned in the channel 80 on the housing cover 22. In this way, the second end 200 of the cable 16 is held securely in place and a connector on the second end 200 can be permanently secured into a receptacle, and the first end 202 of the cable, or a section of cable nearer to the first end 202 can extend through the first opening 32 for extending and retracting the cable 16 through the first opening 32.

As noted, the force of the spring 30 connected between the housing 18 and the frame 24 causes the frame to rotate in a clockwise direction. As the frame 24 rotates in the clockwise direction, the rollers 26 forming the second drum 14 simultaneously orbit around the stationary first drum 12. The orbiting of the second drum 14 causes the guide roller 28 to continuously deposit cable 16 onto the outer surface 74 of the first drum 12 and also deposit cable 16 onto the surface of the second drum 14, which is a segmented surface formed from the surfaces of the rollers 26. Referring now to FIG. 4, the cable 16 may continue to wind until there are multiple side-by-side wraps 16a, 16b, 16c on the first drum 12 and the second drum 14, and multiple overlapping layers 16d, 16e, 16f on at least one of the first 12 and second 14 drums. This is enabled by the width of the first drum 12 and the rollers 26 and by the spacing between the first drum 12 and the rollers 26. As the frame 24 rotates and the cable 16 is retracted, the frictional engagement between the rollers 26 and the track 71 causes the rollers 26 to rotate with respect to the frame 24. In the illustrated embodiment, the rollers 26 rotate in a clockwise direction when the frame 24 is rotated in the clockwise direction. At certain times during retraction, one or more of the rollers 26 may slip with respect to the track 71, which enables smooth retraction of the cable 16 in the multiple layers as described above. Also, while the cable 16 is retracted, the rollers 60, 61 may keep the cable taught and prevent bunching of the cable 16 within the housing 18. The dampener, if included, can control the speed of retraction. Retraction of the cable 16 can be stopped by the user with a desired length of the cable 16 extended from the cable retractor 10 by pulling the cable 16 a short distance sufficient to flip the pawl 50 and engage it with one of the notches 78.

Extension of the cable 16 from the cable retractor 10 causes essentially the opposite operation of the retraction described above. Extension can be initiated by a user pulling on the first end 202 of the cable 16 with sufficient force to overcome the force of the spring 30. This action causes the frame 24 to rotate in a counterclockwise direction, and thus causes the rollers 26 to orbit about the first drum 12 in a counterclockwise direction. As this occurs, the cable 16 is simultaneously unwound from the first drum 12 and the second drum 14. The frictional engagement of the rollers 26 with the track 71 urges the rollers 26 to rotate in a counterclockwise direction to aid in paying out the cable 16 from the first 12 and second 14 drums. The cable 16 can be extended to a desired distance, and then held at this distance by the pawl 50 catching in one of the notches 78 in the periphery of the frame 24.

As noted above, the cable retractor 10 may be used in a variety of arrangements, including the arrangements shown in FIGS. 18-26 wherein the cable retractor 10, with or without the cable guide 160, are mounted to a table 170. In the embodiment shown in FIG. 26, wherein multiple cable retractors 10 are stacked on top of one another, the cable 16 extending from the second opening 72 and routed through the channel 80 of one cable retractor 10 may be nested within the cutout 64 of the housing main body 20 of another adjacent cable retractor 10.

The above descriptions are those of the current embodiments of the invention. Various alterations and changes can be made without departing from the spirit and broader aspects of the invention. Any reference to elements in the singular, for example, using the articles "a," "an," "the," or "said," is not to be construed as limiting the element to the singular.

The invention claimed is:

1. A cable retractor, comprising:
a housing forming an internal chamber;
a first drum within said chamber, said first drum including a stationary outer surface and a first drum axis;
a rotatable frame within said chamber;
a plurality of rollers mounted on said rotatable frame, said rollers collectively forming a second drum that rotates about said first drum about a second drum axis upon rotation of said frame, each of said rollers capable of rotating about its own roller axis;
a spring connected to said housing and said frame for biasing said frame to rotate in one direction;
a latch mechanism connected to said housing and said frame for selectively preventing said frame from rotation; and
a cable, a portion of said cable fixedly connected to said housing, said rollers and said first drum each having sufficient width for at least two side by side wraps of the cable, said rollers being spaced from said outer surface of said first drum to enable wrapping of said cable in multiple layers about one of said first drum and said second drum wherein upon rotation of said frame in said one direction, said cable is retracted into said housing and wrapped about both said first drum and said second drum, and wherein said cable is wrapped both side-by-side and in multiple layers about at least one of said first drum and said second drum, wherein said multiple layers include a first layer adjacent said at least one of said first drum and said second drum and a second layer over said first layer, said multiple layers overlapping in a radial direction with respect to at least one of said first drum axis and said second drum axis; wherein said housing includes a track projecting from a wall of said housing, and a portion of each of said rollers engages said track during rotation of said frame, said engagement urging said rollers to rotate about said roller axes.

2. The cable retractor of claim 1 wherein said portion of said rollers is capable of slipping with respect to said track.

3. The cable retractor of claim 2 wherein said engagement between said rollers and said track is only a frictional engagement.

4. The cable retractor of claim 3 wherein said rollers each include a base adjacent said frame, a distal end opposite said base, and a sidewall extending between said base and said distal end, said distal ends of said rollers engaging said track.

5. The cable retractor of claim 4 wherein said housing includes first and second shell pieces, said frame mounted to said first shell piece, said track extending from said second shell piece.

6. The cable retractor of claim 1 wherein said portion of said cable is fixedly connected to said housing adjacent said outer edge of said first drum.

7. The cable retractor of claim 6 wherein said housing includes an exit opening adjacent said outer edge of said first drum, said cable extending through said exit opening.

8. The cable retractor of claim 7 including a hook-and-loop connection between said cable and said housing adjacent said exit opening.

9. The cable retractor of claim 1 including a dampener engaging said cable to control the speed of said cable as said cable is wound around said second drum.

10. The cable retractor of claim 9 wherein said dampener is a rotational dampening device connected to a dampening wheel, said cable engaged with said dampening wheel.

11. The cable retractor of claim 10 including a spring-loaded guide wheel urging said cable into engagement with said dampening wheel.

12. The cable retractor of claim 1 wherein said housing defines a slot, said cable being retracted through said slot.

13. The cable retractor of claim 12 including a cable guide mounted to said housing adjacent said slot, said cable routed through said cable guide, wherein said cable guide includes a plurality of rollers in engagement with said cable, said rollers guiding said cable into a 90 degree bend.

14. A retractable storage reel for storage of a length of cable, comprising:
   a housing having at least first and second housing portions forming a chamber, a first drum extending into said chamber, said first drum mounted to said housing such that it is stationary with respect to said housing, said first drum including an outer surface for wrapping of said cable, said outer surface having sufficient width for at least two side by side wraps of said cable;
   a rotatable frame within said chamber and pivotally mounted on a frame axis extending from said first portion of said housing, said frame having first and second sides, said first side including a second drum extending therefrom, said second drum including a segmented surface formed by an array of rollers for wrapping of said cable, said second drum segmented surface having sufficient width for at least two side by side wraps of the cable, said rollers being spaced from said outer surface of said first drum to enable wrapping of the cable in multiple layers about said first drum, wherein said multiple layers include a first layer adjacent said first drum and a second layer overlapping said first layer in a radial direction with respect to an axis of said first drum;
   a spring having first and second ends, at least one of said first drum and said housing including a first catch configured to fixedly capture said first end of said spring, said rotatable frame including a second catch to fixedly capture said second end of said spring such that said spring biases said rotatable frame to rotate in one direction, said second housing portion including a first passage to allow passage for a first portion of the cable to the exterior of said chamber;
   at least one of said housing portions defining a second passage for a second portion of the cable to the exterior of said chamber, wherein the cable can freely extend into said chamber from the exterior of said chamber to wrap around said second drum and said first drum, whereby said cable can be extended from said chamber and retracted into said chamber through said second passage;
   a circular track extending around said frame axis and projecting outwardly from a wall of said second housing portion and into frictional engagement with said side surface of said rollers;
   wherein as said frame rotates about said frame axis, said second drum travels about said first drum and said frictional engagement of said track with said side surface of said rollers causes said rollers to rotate with respect to said frame, and at least one roller of said second drum serves as a transition roller for guiding the transfer of a portion of said cable from said second drum surface to said first drum surface as said second drum orbits about said first drum, thereby causing storage of said cable to simultaneously occur onto both said first drum and said second drum as said frame rotates in said one direction to retract the cable into said chamber, and wherein rotation of said frame causes extension of said cable simultaneously from both drums when said frame rotates in the opposite direction.

15. The retractable storage reel of claim 14 wherein said first drum and said transition roller are contoured to be equal to or greater than a specified minimum bend radius of the cable and wherein the first portion of the cable extends through said first passage at a trajectory that is substantially tangent to said outer surface of said first drum thereby restricting bending of the cable to be equal to or greater than the specified minimum bend radius.

16. The retractable storage reel of claim 14 including a speed dampening device mounted within said chamber for acting directly on the cable to control the speed of retraction of the cable.

17. A storage reel system, comprising:
   a cable having a length and first and second connector ends;
   a substantially hollow housing including an axle shaft extending centrally therethrough, said housing defining a first opening for extending and retracting a first portion of said cable nearer to said first connector end from within said housing and a second opening allowing passage of a second portion of said cable nearer to said second connector end from said housing;
   a first drum within said housing, said first drum having an axis substantially aligned with said axle shaft, said first drum having an outer surface for wrapping said cable, said second opening in said housing positioned adjacent to said outer surface of said first drum to enable said second portion of said cable to pass from said first drum through said second opening at a trajectory that is tangent to said outer surface of said first drum;
   a rotatable frame pivotally mounted on said axle shaft within said housing, said frame supporting a second drum formed from a series of rollers positioned about said first drum and spaced from said first drum, wherein one of said rollers is a guide roller for transferring a portion of said cable from said second drum to said first drum, wherein each of said rollers includes a side surface facing said housing; and
   a track within said housing adjacent said rollers, said track extending coaxially about said frame axis and projecting outwardly from a wall of said housing and frictionally engaging said side surface of each of said rollers when said frame rotates, said engagement urging said rollers to rotate with respect to said frame, wherein as said frame rotates in one direction, said second drum orbits about said first drum and said cable winds simultaneously onto both said first and second drums and as said frame rotates in a second direction said second drum orbits about said first drum and said cable is unwound from both said first and second drums.

18. The storage reel system of claim 17 wherein, during rotation of said frame, said rollers can slip with respect to said track.